(12) United States Patent
Maeda et al.

(10) Patent No.: US 7,990,334 B2
(45) Date of Patent: Aug. 2, 2011

(54) RADIO WAVE TRANSMISSION COVER AND METHOD OF MANUFACTURING RADIO WAVE TRANSMISSION COVER

(75) Inventors: Hideto Maeda, Aichi-ken (JP);
Daiichiro Kawashima, Aichi-ken (JP);
Tetsuya Fujii, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 536 days.

(21) Appl. No.: 12/155,765

(22) Filed: Jun. 10, 2008

(65) Prior Publication Data

US 2008/0309579 A1    Dec. 18, 2008

(30) Foreign Application Priority Data

Jun. 13, 2007  (JP) ................................. 2007-156697
Mar. 28, 2008  (JP) ................................. 2008-087964

(51) Int. Cl.
*H01Q 1/32*    (2006.01)
*H01Q 1/42*    (2006.01)

(52) U.S. Cl. ....................................... 343/872; 343/711

(58) Field of Classification Search .................. 343/711, 343/872, 873; 293/115; 296/193.1; 264/328.1
See application file for complete search history.

(56) References Cited

U.S. PATENT DOCUMENTS 6,328,358 B1    12/2001  Berweiler
6,961,023 B2 *  11/2005  Fujii et al. ..................... 343/713

FOREIGN PATENT DOCUMENTS

JP    A-2002-135030    5/2002

\* cited by examiner

*Primary Examiner* — Michael C Wimer
(74) *Attorney, Agent, or Firm* — Posz Law Group, PLC

(57) ABSTRACT

The present invention provides a radio wave transmission cover having superior design and radio wave transmissibility. The radio wave transmission cover includes a front side member (1), a rear side member (5) and a connection layer (6). The front side member (1) and the rear side member (5) are formed separately and are integrated with each other by the connection layer (6). Furthermore, the distance between the front side member (1) and the rear side member (5) in the front-to-rear direction ranges from 0.01 mm to 0.4 mm.

11 Claims, 13 Drawing Sheets

RADIO WAVE TRANSMISSION COVER AND METHOD OF MANUFACTURING RADIO WAVE TRANSMISSION COVER

INCORPORATION BY REFERENCE

This disclosure of Japanese Patent Application No. 2007-156697 filed on Jun. 13, 2007 and Japanese Patent Application No. 2008-87964 filed on Mar. 28, 2008, and including the specification, drawings, and abstract is incorporated by reference in its entirety.

BACKGROUND OF THE INVENTION

1. Field of the Invention

The present invention relates to a radio wave transmission cover, which is provided in front of a radar device for vehicles, and a method of manufacturing the radio wave transmission cover.

2. Description of the Related Art

Adaptive cruise controls (A.C.C.) are techniques, which measure the distance or a relative speed between a subject vehicle and a preceding vehicle, which is in front of the subject vehicle, using a sensor provided in the front end of the subject vehicle, and control a throttle or brake depending on the resultant data to accelerate or decelerate the subject vehicle, thus controlling a vehicle-to-vehicle distance. Recently, such Adaptive-cruise-controls have attracted considerable attention as a core technique for constructing an intelligent transportation system (ITS), which aims to reduce the incidence of traffic jams and accidents.

Typically, laser radar or millimeter wave (extremely high frequency wave) radar is used as the sensor for adaptive cruise controls. For example, millimeter wave radar transmits a millimeter wave, which has a frequency ranging from 30 GHz to 300 GHz and a wavelength ranging from 1 mm to 10 mm, to an object, and receives the millimeter wave, which has been reflected by the object. From this principle, the millimeter wave radar measures the distance or the relative speed between a subject vehicle and a preceding vehicle using the difference between the transmitted wave and the received wave.

Generally, radar devices for vehicles are disposed behind front grills of the vehicles. Such a front grill is uneven in thickness and is made of metal, or has metal-plated layers on the surfaces thereof, thus impeding the travel of radio waves. To overcome this problem, a technique in which a window part is provided in the front grill at a position corresponding to the front end of the radar device and a radio wave transmission cover made of resin is inserted into the window part has been proposed.

The radio wave transmission cover typically has a design layer for expressing various designs. The design layer is a relatively thin layer, which is formed through vapor deposition of metal or transferring of a film. Hence, it is required to cover each of the front surface and the rear surface of the thin design layer with a reinforcing resin layer (for example, refer to Japanese Laid Open Patent Publication NO. 2000-159039 and Japanese Laid Open Patent Publication NO. 2002-135030). FIG. 13 is a view schematically showing a representative example of a conventional radio wave transmission cover. Below, this conventional radio wave transmission cover will be explained with reference to FIG. 13.

To manufacture the radio wave transmission cover, in which front and rear surfaces of a design layer 103 are respectively covered with reinforcing resin layers 102 and 105, the first reinforcing resin layer 102 is first formed, thereafter, the design layer 103 is formed on the resin layer 102 through a vapor deposition, transferring or printing process. Subsequently, the second reinforcing resin layer 105 is formed on the design layer 103, thus completing the radio wave transmission cover.

However, in the conventional technique, because the design layer 103 is relatively thin, when the radio wave transmission cover is manufactured through an injection molding process, the design layer 103 may be deformed by the injection pressure, with which resin is injected to form the resin layer 105 on the design layer 103. Particularly, as shown in FIG. 13, there is the possibility of major deformation of a portion of the design layer 103 around an injection gate 170 of an injection mold 107. As such, if the design layer 103 is deformed, the design of the radio wave transmission cover suffers.

Meanwhile, a radio wave transmission cover may be manufactured by a method in which two reinforcing resin layers 102 and 105 are formed separately and are adhered to each other to form an integrated structure. However, in this case, an adhesive having the same (or almost the same) relative permittivity as that of the two reinforcing resin layers is required in order to adhere the two reinforcing resin layers to each other. If the relative permittivity of the adhesive differs greatly from the relative permittivity of the two reinforcing resin layers, the radio wave transmission loss of the radio wave transmission cover is increased, in other words, the radio wave transmissibility of the radio wave transmission cover is markedly reduced. Typically, polycarbonate or AES is mainly used as material for the reinforcing resin layers. However, the relative permittivity of a typical adhesive does not correspond to the relative permittivity of the above-mentioned resin. Hence, the method in which two reinforcing resin layers are formed separately and are adhered to each other such that they are integrated with each other is problematic in that it is difficult to ensure superior radio wave transmissibility of the radio wave transmission cover.

Furthermore, in the case where two reinforcing resin layers are formed separately, an air layer is formed in a gap between the reinforcing two reinforcing resin layers in the front-to-rear direction (hereinafter, referred to simply as a gap). If the gap is relatively large, the air layer formed between the two reinforcing resin layers is thick. Because the relative permittivity of air differs from the relative permittivity of the two reinforcing resin layers, if the air layer is relatively thick, the radio wave transmissibility is markedly reduced. Therefore, there is a disadvantage in that, if the gap between the two reinforcing resin layers is relatively large, the radio wave transmission cover has poor radio wave transmissibility.

Meanwhile, if the gap between the two reinforcing resin layers is excessively small, when the radio wave transmission cover expands or contracts at high or low temperatures, the two reinforcing resin layers may come into contact with each other. In the case where the design layer is provided between the two reinforcing resin layers and the radio wave transmission cover is configured such that the design thereof is determined by the design layer, if the design layer is damaged by the interference between the two reinforcing resin layers, the design of the radio wave transmission cover may suffer.

To prevent the two reinforcing resin layers from interfering with each other, it is preferable that the linear expansion coefficients of the two reinforcing resin layers and the adhesive match each other. As such, to obtain a radio wave transmission cover having superior radio wave transmissibility, the relative permittivities of the two reinforcing resin layers and the adhesive must match each other, and the linear expansion coefficients of the two reinforcing resin layers and the adhesive must also match each other. However, these characteristics cannot be easily realized. Therefore, it is very difficult to ensure superior radio wave transmissibility of the radio wave transmission cover.

SUMMARY OF THE INVENTION

Accordingly, the present invention has been made keeping in mind the above problems occurring in the prior art, and an object of the present invention is to provide a radio wave transmission cover, which has a superior design and ensures superior radio wave transmissibility, and a method of manufacturing the radio wave transmission cover which has properties above mentioned.

In a first aspect, the present invention provides a radio wave transmission cover provided in front of a radar device for vehicles, comprising: a front side member having a transparent layer made of transparent resin and a design layer formed on the rear side of the transparent layer; a rear side member formed on the rear side of the front side member, the rear side member being made of resin; and a connection layer formed on the circumferential outer edge of at least one selected from the front side member and the rear side member, the connection layer being fixed to the front side member and the rear side member, wherein the front side member is formed separately from the rear side member, and the front side member and the rear side member are spaced apart from each other in the front-to-rear direction by a distance ranging from 0.01 mm to 0.4 mm.

Preferably, the radio wave transmission cover according to the first aspect includes at least one of the following (1) through (4).

(1) the rear side member is formed on the front side member inside the circumferential outer edge of the front side member, the connection layer is made of resin, and the connection layer is welded to the front side member and the rear side member.

(2) the front side member includes a first engaging part, which has an undercut shape, the rear side member includes a second engaging part, which has an undercut shape, and the connection layer includes a third engaging part, which has an undercut shape complementary to the first engaging part, and a fourth engaging part, which has an undercut shape complementary to the second engaging part.

(3) each of the relative permittivity of the transparent resin for the transparent layer, the relative permittivity of the resin for the rear side member and the relative permittivity of the resin for the connection layer to a frequency of 76.5 GHz is within a range of 2.7±1.5 at room temperature.

(4) the connection layer is disposed at a position other than the radio wave transmitting area of the radio wave transmission cover.

The method of manufacturing a radio wave transmission cover according to a second aspect of the present invention is a method of manufacturing the radio wave transmission cover including the above-mentioned (2). The method comprises: forming a convex gas interruption part in one selected from the front side member and the rear side member, the convex gas interruption part having a convex shape and extending in the circumferential direction of the radio wave transmission cover; forming a concave gas interruption part in a remaining one of the front side member and the rear side member, the concave gas interruption part having a concave shape and extending in the circumferential direction of the radio wave transmission cover; coupling the front side member to the rear side member such that the convex gas interruption part is inserted into the concave gas interruption part; forming the connection layer by injecting molten resin into a cavity of an injection mold, in which the front side member and the rear side member are placed; and forming a gas exhaust hole in the connection layer at a position downstream of a resin injection gate of the injection mold with respect to the direction of the flow of resin when the connection layer is formed, the gas exhaust hole communicating with a gap defined between the convex gas interruption part and the concave gas interruption part and being open through an outer surface of the connection layer.

Preferably, the method of manufacturing the radio wave transmission cover according to the present invention includes the following (5).

(5) the gas exhaust hole is sealed by a sealing member after the connection layer is formed.

In the radio wave transmission cover according to the present invention, the front side member and the rear side member are formed separately, so that the design layer can be prevented from deforming due to the injection pressure at which resin is injected when the rear side member is formed. Therefore, the superior design of the radio wave transmission cover of the present invention can be ensured.

Furthermore, in the radio wave transmission cover according to the present invention, the front side member and the rear side member are spaced apart from each other in the front-to-rear direction by a distance ranging from 0.01 mm to 0.4 mm. As such, because the distance between the front side member and the rear side member with respect to the front-to-rear direction is 0.4 mm or less, that is, because the gap between the front side member and the rear side member is sufficiently small, the air layer formed in the gap between the front side member and the rear side member can be relatively thin, thus markedly enhancing the radio wave transmissibility of the radio wave transmission cover.

In addition, because the distance between the front side member and the rear side member with respect to the front-to-rear direction is 0.01 mm or more, that is, because the gap between the front side member and the rear side member is sufficiently large, the front side member and the rear side member are prevented from interfering with each other at high or low temperatures, so that the design layer between the front side member and the rear side member is prevented from being damaged. Thereby, the superior design of the radio wave transmission cover of the present invention can be ensured. It is further preferable that the distance between the front side member and the rear side member with respect to the front-to-rear direction be 0.05 mm or more. In this case, the front side member and the rear side member can be more reliably prevented from interfering with each other at high or low temperatures. Hence, the superior design of the radio wave transmission cover can be ensured.

In the radio wave transmission cover according to the present invention, the front side member and the rear side member are integrated with each other through the connection layer. The connection layer is formed on the circumferential outer edge of at least one selected from the front side member and the rear side member. Therefore, even when the connection layer is formed, for example, by an insert molding method, on the front side member and the rear side member, which are previously formed, the design layer can be prevented from deforming due to resin injection pressure when the connection layer is formed. Particularly, the portion of the design layer that is disposed inside the circumferential outer edge of the radio wave transmission cover can be more reliably prevented from deforming. Furthermore, the rear part of the radio wave transmission cover comprises the rear side member, which is formed separately from the front side member. Accordingly, the connection layer can be reduced in size. Thus, because the total amount of heat that is applied to the design layer when the connection layer is formed through the injection molding process is reduced, the design layer can be prevented from deforming. As a result, the superior design of the radio wave transmission cover of the present invention can be ensured.

In the radio wave transmission cover of the present invention including the above-mentioned (1), the connection layer is welded to the front side member and the rear side member, so that the front side member, the rear side member and the connection layer are firmly integrated with each other. Furthermore, the connection layer is made of resin rather than adhesive. Thus, as the material for the connection layer, material having a relative permittivity and a linear expansion coefficient corresponding to those of the front side member and the rear side member can be selected. Therefore, the radio wave transmissibility of the radio wave transmission cover can be further improved.

In the radio wave transmission cover of the present invention including the above-mentioned (2), the third engaging part of the connection layer engages with the first engaging part of the front side member, and the fourth engaging part of the connection layer engages with the second engaging part of the rear side member. Thus, the front side member and the rear side member are welded to and engaged with the connection layer. In other words, the front side member, the rear side member and the connection layer are both chemically and mechanically integrated with each other. Therefore, in the radio wave transmission cover including the above-mentioned (2), the front side member, the rear side member and the connection layer can be more firmly integrated with each other.

In the radio wave transmission cover of the present invention including the above-mentioned (3), the relative permittivity of resin (transparent resin) for the transparent layer, the relative permittivity of resin for the rear side member and the relative permittivity of resin for the connection layer are matched with each other (or are similar to each other). Therefore, the radio wave transmission cover of the present invention including the above-mentioned (3) can ensure superior radio wave transmissibility.

In the radio wave transmission cover of the present invention including the above-mentioned (4), the connection layer is disposed at a position other than the radio wave transmitting area of the radio wave transmission cover. Here, the term "radio wave transmitting area" means the portion of the radio wave transmission cover through which transmitting waves and receiving waves of the radar device for vehicles pass. The radio wave transmitting area is determined by various factors, such as the kind of the radar device for vehicles, the shape of the radar device, the position at which the radar device is installed in a vehicle, the distance between the radar device and the radio wave transmission cover, the angle between the radar device and the radio wave transmission cover, etc. Because the connection layer is disposed at a position other than the radio wave transmitting area, the influence of the connection layer on the radio wave transmissibility of the radio wave transmission cover can be eliminated. Therefore, the radio wave transmission cover can have superior radio wave transmissibility.

In the case where the front side member and the rear side member are formed separately and the connection layer is formed through an injection molding process, there is the possibility of the penetration of gas, which is generated from molten resin, which is material for the connection layer when the injection molding process is conducted (hereinafter, referred to simply as gas), into the gap between the front side member and the rear side member. In this case, the design layer may be contaminated and deformed by gas. Furthermore, when the connection layer contracts after being formed, the gap between the front side member and the rear side member (that is, the space defined by the front side member and the rear side member) enters a state of negative pressure. As such, in the case where the gap between the front side member and the rear side member enters the state of negative pressure, after the radio wave transmission cover has been mounted to the vehicle, water may undesirably enter the gap between the front side member and the rear side member. If water is entered between the front side member and the rear side member, the design layer may be deformed, with the result that the radio transmissibility of the radio wave transmission cover may suffer.

According to the method of manufacturing the radio wave transmission cover of the present invention, in the gap between the front side member and the rear side member, the portion defined between the convex gas interruption part and the concave gas interruption part has a bent shape (as men speak, a labyrinth shape). Therefore, gas that enters the gap between the front side member and the rear side member and reaches the gap between the convex gas interruption part and the concave gas interruption part can no longer enter the inside portion of the radio wave transmission cover. Furthermore, gas that reaches the gap between the convex gas interruption part and the concave gas interruption part, is exhausted outside the radio wave transmission cover through the gas exhaust hole. Therefore, gas can be more reliably prevented from entering the portion of the radio wave transmission cover that is disposed inside the convex gas interruption part and the concave gas interruption part. Furthermore, the inside and outside of the radio wave transmission cover can communicate with each other through the gas exhaust hole. Thus, the gap between the front side member and the rear side member is prevented from entering a state of negative pressure. Therefore, a radio wave transmission cover having a superior design and radio wave transmissibility can be manufactured by the method of manufacturing the radio wave transmission cover according to the present invention.

In the method of manufacturing the radio wave transmission cover according to the present invention including the above-mentioned (5), because the gas exhaust hole is sealed after the connection layer is formed, foreign substances such as water are prevented from entering the radio wave transmission cover through the gas exhaust hole. Accordingly, the method of manufacturing the radio wave transmission cover according to the present invention including the above-mentioned (5) can ensure a superior design and superior radio wave transmissibility of the radio wave transmission cover.

BRIEF DESCRIPTION OF THE DRAWINGS

The above and other objects and features of the present invention will become apparent from the following description of specified embodiments, given in conjunction with the accompanying drawings, in which.

DESCRIPTION OF THE SPECIFIC EMBODIMENTS

Figure 1:
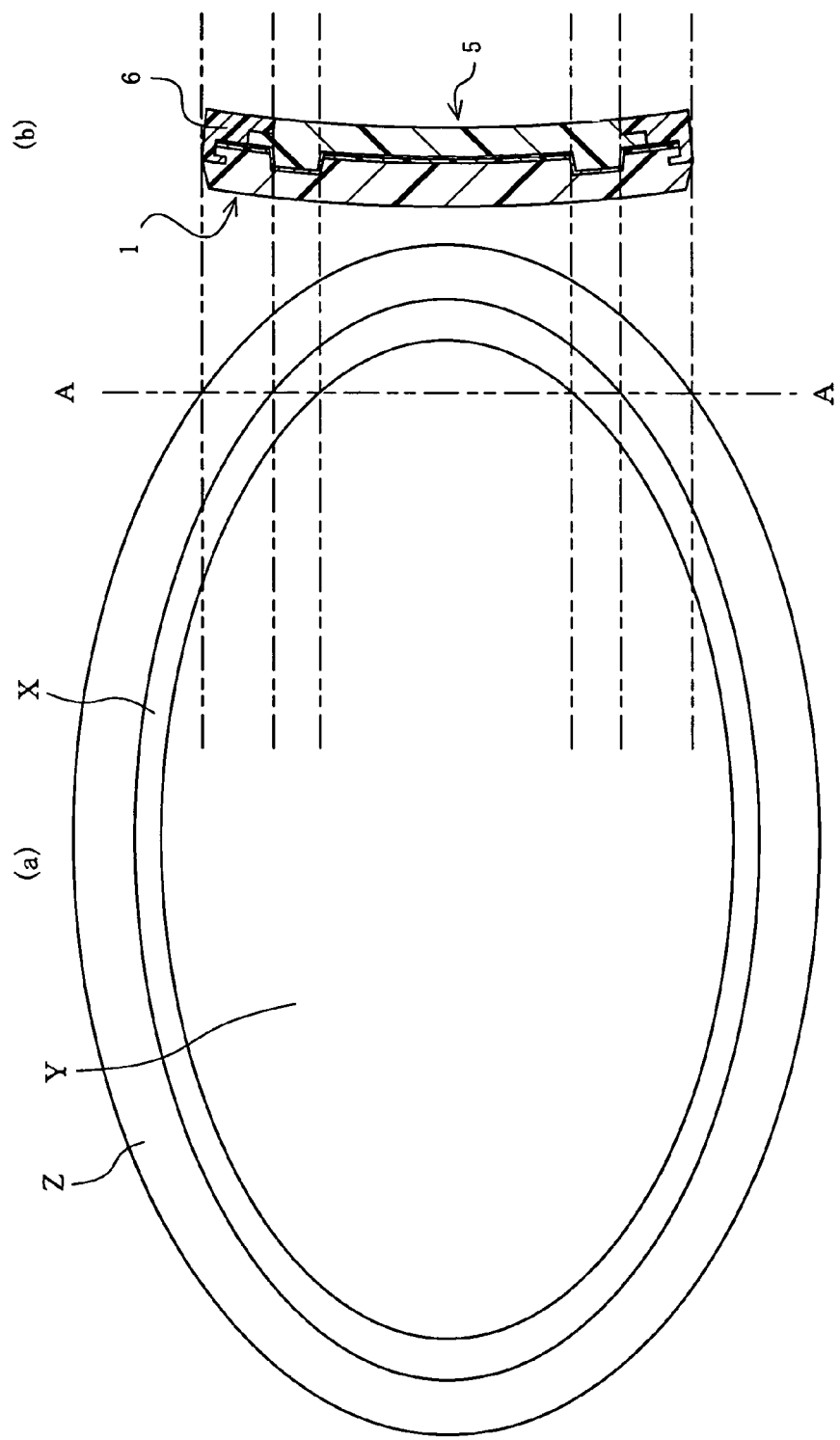
FIG. 1 is views illustrating a radio wave transmission cover, according to a first embodiment of the present invention.

Various embodiments of the present invention will now be described in detail with reference to the accompanying drawings.

In a radio wave transmission cover according to the present invention, a front side member and a rear side member are spaced apart from each other by a predetermined distance in the front-to-rear direction. As methods of determining the distance by which the front side member and the rear side member are spaced apart from each other, there are a method in which the positions of the front side member and the rear side member with respect to each other are determined using a spacer when the front side member and the rear side member are integrated with each other using a connection layer, and a method in which the positions of the front side member and the rear side member with respect to each other are determined using a mold for forming the connection layer. Here, in the case where the positions of the front side member and the rear side member with respect to each other are determined using the spacer, a separate member, which is separated from the radio wave transmission cover, may be used as the spacer, or, alternatively, part of the radio wave transmission cover may be used as the spacer. For example, a separate spacer, which is separated from the front side member and the rear side member, may be provided in a gap, which is defined between the front side member and the rear side member in the front-to-rear direction. Alternatively, the spacer may be integrated with at least one selected from the front side member and the rear side member.

A transparent layer of the front side member constitutes a front part of the radio wave transmission cover of the present invention. Therefore, it is preferable that the transparent layer be made of transparent resin having superior weather resistance. Polycarbonate resin and acryl resin are representative examples of transparent resin having superior weather resistance.

In the radio wave transmission cover of the present invention, a design layer is formed on the rear side of the transparent layer. The design layer may be formed by vapor-depositing metal such as indium on the transparent layer. Alternatively, the design layer may be formed on the transparent layer by screen-printing. As a further alternative, the design layer may be formed by transferring a design, which is printed on a transfer film in a predetermined shape, onto the transparent layer. The design layer may be made using a single kind of material, or, alternatively, using several kinds of material. In addition, the design layer may have a single layer, or, alternatively, may have several layers. For example, a sheet, which is made by adhering a flaky film, on which a second design is formed by vapor deposition, to a resin film, on which a first design is printed, may be used as the design layer. Moreover, a protective layer may be formed on the front surface and/or the rear surface of the design layer.

In the radio wave transmission cover of the present invention, the rear side member is formed separately from the front side member. The rear side member may be made of the same kind of resin as that of the front side member, or, alternatively, it may be made of a different kind of resin from that of the front side member. Furthermore, in the case where polycarbonate resin is used as the transparent resin, AES resin is preferably used as the resin for the rear side member. In this case, because AES resin has almost the same relative permittivity as polycarbonate resin, radio waves can evenly (or almost evenly) transmit the radio wave transmission cover.

Furthermore, it is preferable that material that can be fixed to the front side member and the rear side member be used as the material for the connection layer. For example, adhesive or resin material (in particular, thermoplastic resin) can be used as the material for the connection layer. In any case, if the connection layer is disposed at a position other than the area through which radio waves penetrate the radio wave transmission cover, a reduction in radio wave transmissibility attributable to the connection layer can be reliably prevented. In addition, in the case where the material is used for the connection layer having the same relative permittivity (or almost the same relative permittivity) as that of the transparent resin or resin material for the rear side member, even if the connection layer is disposed within an area through which radio waves penetrate the radio wave transmission cover, a reduction in radio wave transmissibility can be prevented.

In the case where the connection layer is welded to the front side member and the rear side member, there is an advantage in that the front side member and the rear side member can be firmly fixed to each other through the connection layer. In this case, resin material having a melting point equal to or higher than that of the transparent resin and the resin material for the rear side member is preferably used as resin material for the connection layer. Furthermore, the transparent resin or the same resin material as that of the rear side member may be used as the resin material for the connection layer. Alternatively, another kind of resin material may be used. In the case where polycarbonate resin is used as the transparent resin, AES resin is preferably used as the resin material for the connection layer.

Hereinafter, the radio wave transmission cover according to the present invention will be described with reference to the attached drawings.

First Embodiment

Figure 2:
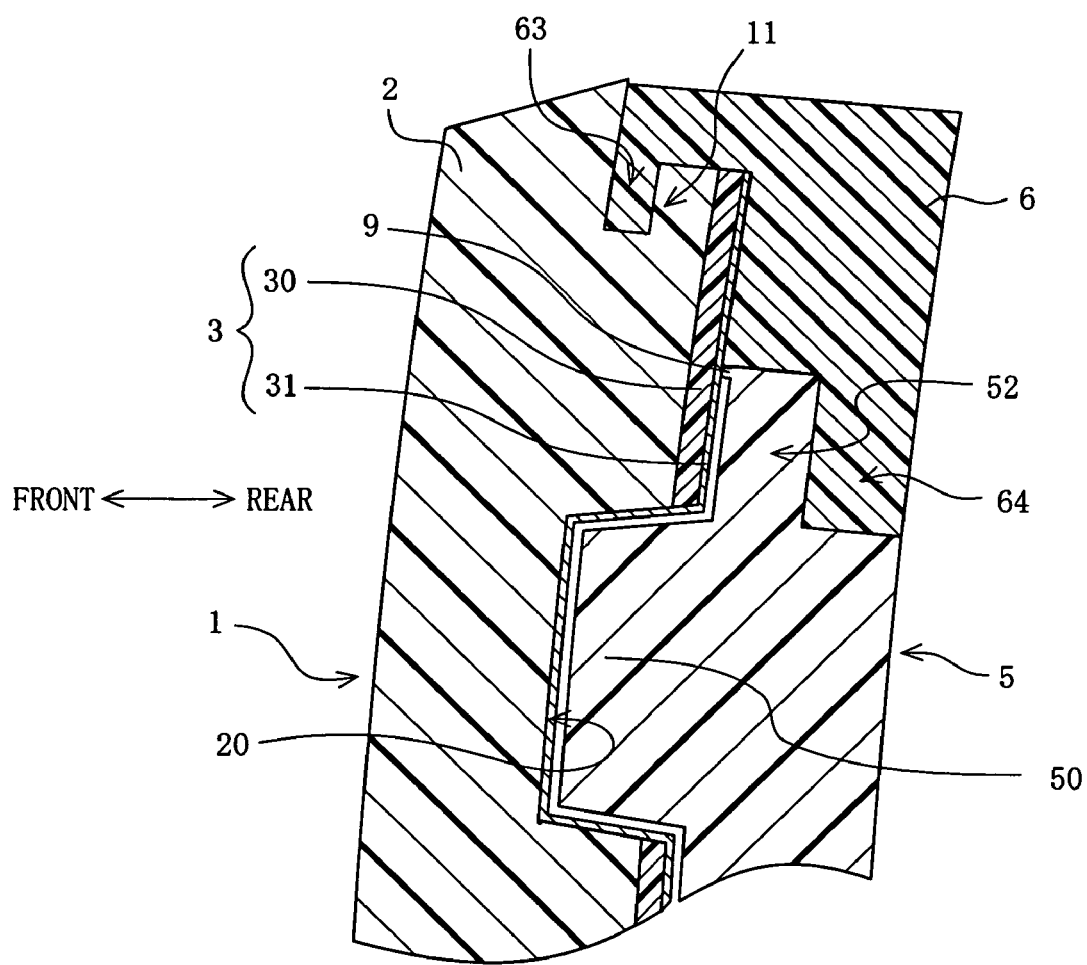
FIG. 2 is an enlarged view of a main part of FIG. 1b.
Figure 3:
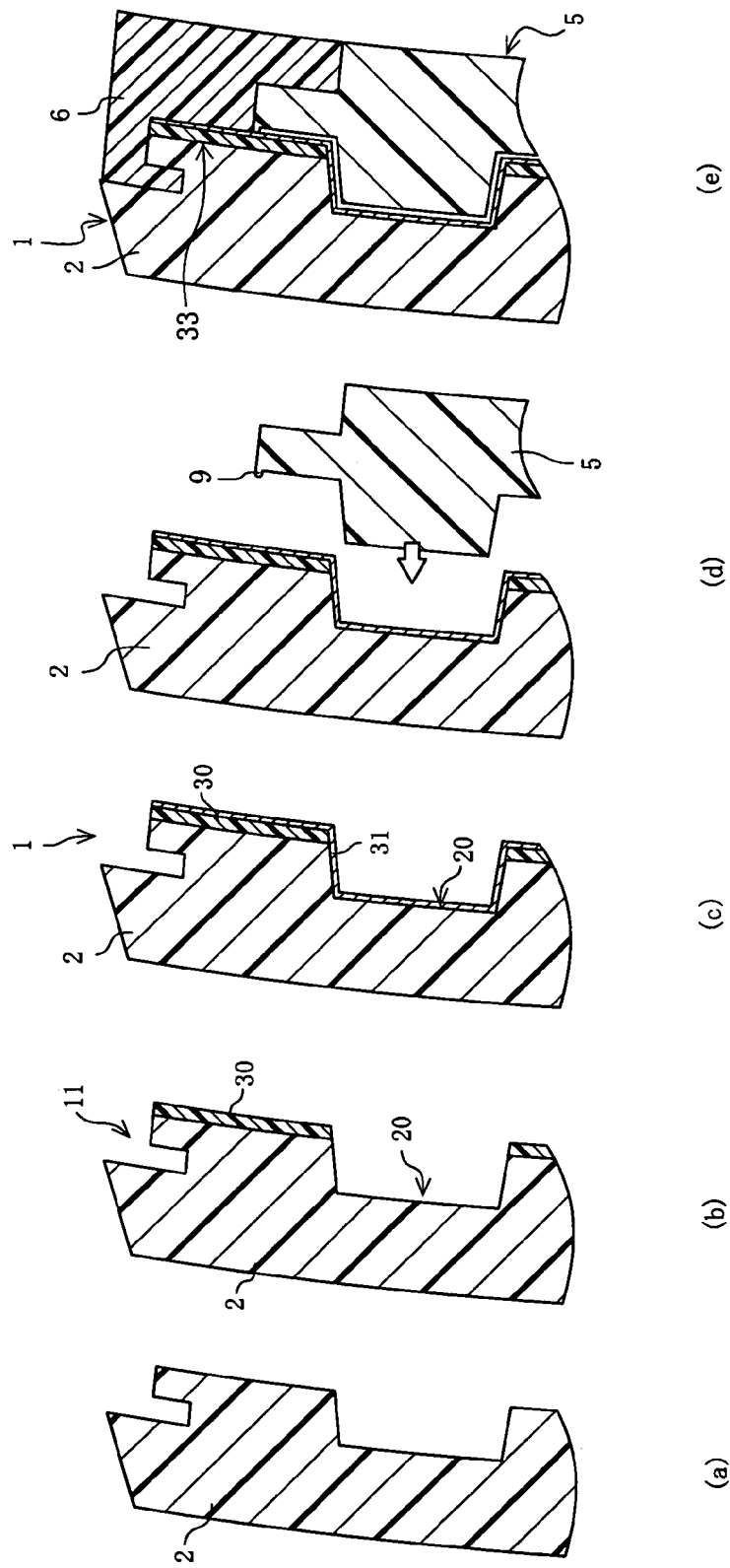
FIG. 3 is views illustrating a process of manufacturing the radio wave transmission cover according to the first embodiment of the present invention.

A radio wave transmission cover according to a first embodiment includes the above (1) through (4). The radio wave transmission cover according to the first embodiment of the present invention is fitted into an opening formed in the front grill of a vehicle. A millimeter wave radar device for vehicles is installed behind the radio wave transmission cover of the first embodiment. FIG. 1 is views illustrating the radio wave transmission cover of the first embodiment. FIG. 1a is a front view showing the radio wave transmission cover according to the first embodiment. FIG. 1b is a sectional view taken along the line A-A of FIG. 1a. FIG. 2 is an enlarged view of a main part of FIG. 1b. FIG. 3 is views illustrating the process of manufacturing the radio wave transmission cover according to the first embodiment. Hereinafter, in the first embodiment, the terms "front" and "rear" respectively are defined front and rear shown in FIG. 2.

As shown in FIG. 1a, the radio wave transmission cover according to the first embodiment has an approximately elliptical plate shape. As shown in FIGS. 1b and 2, the radio wave transmission cover according to the first embodiment includes a front side member 1, a spacer 9, a rear side member 5 and a connection layer 6. The front side member 1 constitutes the front part of the radio wave transmission cover. The connection layer 6 constitutes the circumferential outer edge (that is, peripheral part, perimeter part) of a rear part of the radio wave transmission cover. The rear side member 5 constitutes the rear part of the radio wave transmission cover, in detail, a portion of the rear part inside the connection layer 6. Here, the distance between the front side member 1 and the rear side member 5 in the front-to-rear direction (that is, the distance between the rear surface of the front side member 1 and the front surface of the rear side member 5) is 0.1 mm.

As shown in FIG. 2, the front side member 1 includes a transparent layer 2 and a design layer 3. The transparent layer 2 is made of polycarbonate resin, which is a kind of transparent resin. The relative permittivity of the polycarbonate resin to a frequency of 76.5 GHz ranges from 2.6 to 2.8 at room temperature. As shown in FIG. 1, the transparent layer 2 has an approximately elliptical plate shape, and the transparent layer 2 has a depression 20, which has an annular shape, is arranged in the rear surface side of the transparent layer 2. A first engaging part 11, which extends in the circumferential direction of the transparent layer 2, is provided outside the depression 20, that is, on the circumferential outer edge of the transparent layer 2. The first engaging part 11 has an undercut shape, in which part thereof is cut with respect to the thickness direction of the radio wave transmission cover.

The design layer 3 is formed on the rear surface of the transparent layer 2. The design layer 3 includes a printed part 30, which is formed by screen-printing black paint, and a vapor-deposited part 31, which is formed by vapor-depositing indium. The printed part 30 is formed on the rear surface of the transparent layer 2, but is not formed in the depression 20. The vapor-deposited part 31 is formed both on the rear surface of the printed part 30 and on the inner surface of the depression 20. Therefore, as shown in FIG. 1a, when seen in the front view of the radio wave transmission cover of the first embodiment, the color of the metal, which is derived from the vapor-deposited part 31, is displayed through the interior X of the depression 20. The portion Y inside the inner circumference of the depression 20 and the portion Z outside the outer circumference thereof are displayed in black, derived from the printed part 30. Furthermore, a reinforcing layer (not shown) is formed on the rear surface of the design layer 3 by being coated with acryl resin through a heat coating method and a UV coating method. The reinforcing layer is interposed between the design layer 3 and the rear side member 5 and between the design layer 3 and the connection layer 6.

The rear side member 5 is made of mixed resin material of polycarbonate resin and carbon black. The relative permittivity of the mixed resin material to a frequency of 76.5 GHz ranges from 2.6 to 2.8 at room temperature. As shown in FIG. 1, the rear side member 5 has an approximately elliptical plate shape. The outer diameter of the rear side member 5 is smaller than that of the front side member 1. The rear side member 5 is provided on the rear surface of the front side member 1 inside the circumferential outer edge of the front side member 1. Rear side member 5 has a protruding part 50, which has an annular shape, is arranged in the front surface side of the rear side member 5. The protruding part 50 has a shape roughly complementary to the depression 20 in the front side member 1 and is inserted into the depression 20.

A second engaging part 52, which extends in a circumferential direction, is provided on the portion of the rear side member 5 that is disposed outside the protruding part 50. The second engaging part 52 has an undercut shape, in which part thereof is cut with respect to the thickness direction of the radio wave transmission cover.

The spacer 9 is integrated with the rear side member 5. In detail, the spacer 9 has an approximate ring shape, which extends along the circumferential outer edge of the rear side member 5 and protrudes towards the front side member 1, and is integrally formed with the rear side member 5 into a single body. The protruding height of the spacer 9 is 0.1 mm. Furthermore, the spacer 9 faces to the printed part 30.

The connection layer 6 is made of the same mixed resin material of polycarbonate resin and carbon black as is the rear side member 5. The connection layer 6 has an approximately annular plate shape and is provided on the circumferential outer edge of the rear surface of the transparent layer 2. In the radio wave transmission cover of the first embodiment, the radio wave transmitting area is defined by the portions X and Y designated in FIG. 1a. As shown in FIG. 1, the connection layer 6 is disposed outside the portions X and Y. Therefore, in the radio wave transmission cover of the first embodiment, the connection layer 6 is outside the radio wave transmitting area.

A third engaging part 63, which extends in a circumferential direction, is provided in the connection layer 6 at a position corresponding to the first engaging part 11. The third engaging part 63 has an undercut shape complementary to the first engaging part 11. Furthermore, a fourth engaging part 64, which extends in a circumferential direction, is provided in the connection layer 6 at a position corresponding to the second engaging part 52. The fourth engaging part 64 has an undercut shape complementary to the second engaging part 52. The third engaging part 63 engages with the first engaging part 11, and the fourth engaging part 64 engages with second engaging part 52. In addition, the connection layer 6 and the front side member 1 (the transparent layer 2) are welded to each other at the junction therebetween. The connection layer 6 and the rear side member 5 are also welded to each other at the junction therebetween.

Below, a method of manufacturing the radio wave transmission cover according to the first embodiment of the present invention will be explained.

(First process) First, the transparent layer 2 is formed through an injection molding process, as shown in FIG. 3a.

(Second process) The printed part 30 is formed on the rear surface of the transparent layer 2, which is formed through the first process. In detail, the printed part 30 is formed by screen-printing black paint on portions of the rear surface of the transparent layer 2 other than the interior of the depression 20 and the first engaging part 11 (refer to FIG. 3b).

(Third process) The front surface and the side surface of a composite body of the transparent layer 2 and the printed part 30, which is obtained after the second process, are masked. Thereafter, indium is vapor-deposited on the rear surface of the printed part 30 and the inner surface of the depression 20, thus forming the vapor-deposited part 31. After the third process is completed, the reinforcing layer is formed on the rear surfaces of the printed part 30 and the vapor-deposited part 31 using acryl resin through a heat coating method and a UV coating method. The front side member 1 is obtained through the above-mentioned processes (refer to FIG. 3c).

(Fourth process) The rear side member 5, which is formed through an injection molding process separate from that of the front side member 1, is inserted into the rear side of the front side member 1, and they are placed in an injection mold (refer to FIG. 3d). Here, the spacer 9 is integrally formed on the rear side member 5. Therefore, the relative positions of the front side member 1 and the rear side member 5 are determined both by the injection mold (not shown) and by the spacer 9. In this embodiment, the distance between the front side member 1 and the rear side member 5 in the front-to-rear direction is limited to 0.1 mm.

(Fifth process) The connection layer 6 is formed by an insert molding method using the injection mold, in which the front side member 1 and the rear side member 5 are placed. The connection layer 6 is formed both on the rear surface of the front side member 1 and on the circumferential outer edge of the rear side member 5. In detail, molten mixed resin material of polycarbonate resin and carbon black is injected into a cavity in the injection mold, in which the composite body of the front side member 1 and the rear side member 5 is placed. Then, part of the transparent layer 2 is melted by the heat of the molten mixed resin material and is thus mixed with the molten mixed resin material. Furthermore, part of the rear side member 5 is melted by the heat of the molten mixed resin material and is thus mixed with the molten mixed resin material. Therefore, in the product that is obtained through the injection molding process, the connection layer 6 and the front side member 1 (transparent layer 2) are welded to each other at the junction therebetween, and the connection layer 6 and the rear side member 5 are also welded to each other at the junction therebetween. Ultimately, the radio wave transmission cover of the first embodiment is produced through the above-mentioned first through fifth processes.

In the radio wave transmission cover of the first embodiment, the front side member 1 and the rear side member 5 are formed separately, so that the design layer 3 is prevented from deforming due to the pressure at which resin is injected into a mold when the rear side member 5 is formed. Furthermore, the connection layer 6 is disposed on the circumferential outer edge of the rear part of the radio wave transmission cover. Therefore, in the fifth process, although the connection layer 6 is formed through the injection molding process, the design layer 3 (particularly, the vapor-deposited part 31, which is formed on the inside portion of the radio wave transmission cover) is prevented from deforming due to injection pressure. Meanwhile, when the connection layer 6 is formed through the injection molding process, the injection pressure is applied to the portion (a design layer perimeter portion 33) of the design layer 3 that is disposed on the perimeter of the radio wave transmission cover. Thus, the design layer perimeter portion 33 is slightly deformed. However, in the design layer perimeter portion 33, the printed part 30 is formed on the front surface of the vapor-deposited part 31, to which injection pressure is applied, does not affect the external appearance of the radio wave transmission cover. Hence, the superior design of the radio wave transmission cover of the first embodiment is ensured.

As well, in the radio wave transmission cover of the first embodiment, the distance between the front side member 1 and the rear side member 5 in the front-to-rear direction is 0.1 mm, which is not excessively short. Therefore, in the radio wave transmission cover of the first embodiment, the front side member and the rear side member are prevented from interfering with each other at high or low temperature, and the design layer is prevented from being damaged. Thereby, the superior design of the radio wave transmission cover of the first embodiment can be ensured.

Moreover, in the radio wave transmission cover of the first embodiment, because the front side member 1 and the connection layer 6 are welded to each other and are thus integrated with each other, there is no gap between the front side member 1 and the connection layer 6. In addition, because the rear side member 5 and the connection layer 6 are also welded to each other and are thus integrated with each other, there is no gap between the rear side member 5 and the connection layer 6. Therefore, a foreign substance such as water is prevented from entering the radio wave transmission cover through the gap. Hence, the radio wave transmission cover of the first embodiment can prevent the design layer 3 from deforming due to a foreign substance, thus ensuring a superior design.

In the radio wave transmission cover of the first embodiment, the front side member 1 (the transparent layer 2) and the connection layer 6 are welded to each other, and the rear side member 5 and the connection layer 6 are also welded to each other. In other words, the front side member 1, the rear side member 5 and the connection layer 6 are chemically integrated with each other by the welding between the front side member 1 and the connection layer 6 and by the welding between the rear side member 5 and the connection layer 6. Accordingly, the front side member 1, the connection layer 6 and the rear side member 5 can be firmly integrated with each other. The third engaging part 63 of the connection layer 6 engages with the first engaging part 11 of the front side member 1. The fourth engaging part 64 of the connection layer 6 engages with the second engaging part 52 of the rear side member 5. In other words, the front side member 1, the rear side member 5 and the connection layer 6 are mechanically integrated with each other by the engagement between the first engaging part 11 and the third engaging part 63 and by the engagement between the second engaging part 52 and the fourth engaging part 64. Therefore, in the radio wave transmission cover of the first embodiment, the front side member 1, the connection layer 6 and the rear side member 5 can be more firmly integrated with each other.

Furthermore, in the radio wave transmission cover of the first embodiment, because the distance between the front side member 1 and the rear side member 5 in the front-to-rear direction is 0.1 mm, which is not excessively long, the influence of air layer on the radio wave transmissibility of the radio wave transmission cover can be reduced. Therefore, the radio wave transmission cover of the first embodiment can ensure superior radio wave transmissibility.

The relative permittivities of the transparent resin (polycarbonate resin), resin for the rear side member and resin (mixed resin) for the connection layer to a frequency of 76.5 GHz are within a range of 2.7±1.5 at room temperature. Hence, the radio wave transmission cover of the first embodiment enables radio waves to evenly transmit it in the thickness direction or in the radial direction, and can reduce wave transmission loss. Thereby, the radio wave transmission cover of the first embodiment can also ensure superior radio wave transmissibility.

In addition, because the connection layer 6 is disposed outside the radio wave transmitting area, the influence of the connection layer 6 on the radio wave transmissibility of the radio wave transmission cover is eliminated. Therefore, the radio wave transmission cover of the first embodiment can more reliably ensure superior radio wave transmissibility.

In the radio wave transmission cover of the first embodiment, the spacer 9 is provided between the front side member 1 and the rear side member 5. Hence, when the connection layer 6 is formed, the spacer 9 prevents the material (molten resin) for the connection layer 6 from entering the space between the front side member 1 and the rear side member 5, such that the material for the connection layer 6 is prevented from being inserted into the inside portion of the radio wave transmission cover. In other words, the spacer 9 has a function of determining the relative positions of the front side member 1 and the rear side member 5 and, in addition, has a function of preventing molten resin from entering the space between the front side member 1 and the rear side member 5 when forming the connection layer 6. Therefore, the superior design of the radio wave transmission cover of the first embodiment can be more reliably ensured.

Furthermore, in the first embodiment, although the height (the length in the front-to-rear direction) of the spacer 9 has been illustrated as being equal to the distance between the front side member 1 and the rear side member 5 in the front-to-rear direction, the height of the spacer 9 may be greater than the distance between the front side member 1 and the rear side member 5. In this case, the spacer 9 is brought into contact with the front side member 1 (or the rear side member 5) under pressure. As such, in the case where the spacer 9 elastically contacts the front side member 1 or the rear side member 5, the space between the front side member 1 and the rear side member 5 can be reliably sealed by the spacer 9, so that molten resin can be firmly prevented from entering the space between the front side member 1 and the rear side member 5. As well, a protruding edge of the spacer 9 may have a lip shape and elastically contact the front side member 1 or the rear side member 5. In this case, the space between the front side member 1 and the rear side member 5 can be sealed by the spacer 9 more reliably.

Second Embodiment

Figure 4:
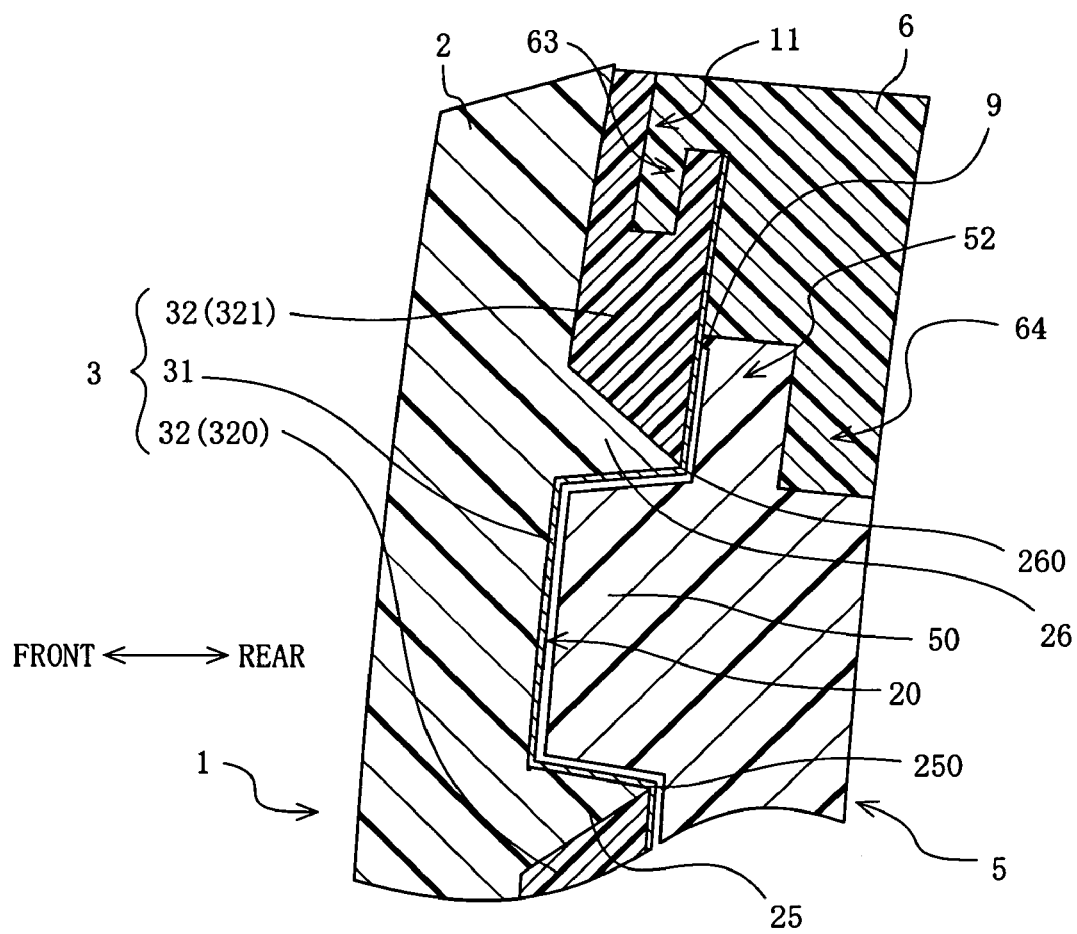
FIG. 4 is an enlarged view illustrating a main part of a radio wave transmission cover, according to a second embodiment of the present invention.

A radio wave transmission cover according to a second embodiment of the present invention includes the above (1) through (4). FIG. 4 is an enlarged view illustrating a main part of the radio wave transmission cover according to the second embodiment of the present invention. In detail, FIG. 4 is an enlarged sectional view of the main part of the radio wave transmission cover of the second embodiment, corresponding to the sectional view taken along the line A-A of FIG. 1a. Hereinafter, in the second embodiment, the terms "front" and "rear" respectively are defined front and rear shown in FIG. 4.

In the radio wave transmission cover of the second embodiment, a design layer 3 includes a colored resin layer 32, which is made of mixed resin material of polycarbonate resin and carbon black, and a vapor-deposited part 31, which is formed by vapor-depositing indium. The colored resin layer 32 is formed on the rear surface of a transparent layer 2 by a two-tone forming method. That is, in the radio wave transmission cover of the second embodiment, part of the design layer 3 is integrally formed with the transparent layer 2. The distance between a front side member 1 and a rear side member 5 in the front-to-rear direction is 0.1 mm.

The transparent layer 2 has two parting parts 25 and 26, which protrude to the rear surface side of the transparent layer 2. Each of the two parting parts 25 and 26 has a wall shape, which protrudes to have an annular shape. A protruding edge of each parting part 25, 26 has a tip shape. The first parting part 25, which is one of the parting part, is provided inside the second parting part 26, which is another parting part. A depression 20, which has an annular shape in the same manner as that of the transparent layer 2 of the radio wave transmission cover of the first embodiment, is defined between the first parting part 25 and the second parting part 26.

On the rear surface of the transparent layer 2, the colored resin layer 32 is formed inside the first parting part 25 and outside the second parting part 26. The portion of the colored resin layer 32 that is disposed inside the first parting part 25 is designated an inside colored resin layer 320. The portion of the colored resin layer 32 that is disposed outside the second parting part 26 is designated an outside colored resin layer 321. The outside colored resin layer 321 has a first engaging part 11.

As shown in FIG. 4, the circumferential outer surface of the inside colored resin layer 320 is in contact with the circumferential inner surface of the first parting part 25. The circumferential inner surface of the outside colored resin layer 321 is in contact with the circumferential outer surface of the second parting part 26. The protruding edge 250 of the first parting part 25 protrudes from the circumferential outer edge of the inside colored resin layer 320 in the rearward direction. The protruding edge 260 of the second parting part 26 protrudes from the circumferential inner edge of the outside colored resin layer 321 in the rearward direction.

The vapor-deposited part 31 is formed on the rear surface of the transparent layer 2, on the rear surface of the inside colored resin layer 320 and on the rear surface of the outside colored resin layer 321.

The rear side member 5 is made of mixed resin material of polycarbonate resin and carbon black. The relative permittivity of the mixed resin material to a frequency of 76.5 GHz ranges from 2.6 to 2.8 at room temperature. The rear side member 5 according to the second embodiment has the same shape as that of the rear side member 5 of the radio wave transmission cover according to the first embodiment. Rear side member 5 has a protruding part 50, which has an annular shape, is arranged in the front surface side of the rear side member 5. The protruding part 50 is inserted into the depression 20. A second engaging part 52, which extends in a circumferential direction, is provided on the portion of the rear side member 5 that is disposed outside the protruding part 50.

A spacer 9 is integrally formed with the rear side member 5. In detail, the spacer 9 has an approximate ring shape, which extends along the circumferential outer edge of the rear side member 5 and protrudes towards the front side member 1, and is integrally formed with the rear side member 5 into a single body. The protruding height of the spacer 9 is 0.1 mm. Furthermore, the spacer 9 faces to the outside colored resin layer 321 of the front side member 1.

The connection layer 6 is made of mixed resin material of polycarbonate resin and carbon black. Here, the relative permittivity of the mixed resin material to a frequency of 76.5 GHz ranges from 2.6 to 2.8 at room temperature. The connection layer 6 according to the second embodiment has almost the same shape as the connection layer 6 of the radio wave transmission cover according to the first embodiment. The connection layer 6 has a third engaging part 63, which engages with the first engaging part 11, and a fourth engaging part 64, which engages with the second engaging part 52. In addition, the connection layer 6 and the front side member 1 (outside colored resin layer 321) are welded to each other at the junction therebetween. The connection layer 6 and the rear side member 5 are also welded to each other at the junction therebetween. In the radio wave transmission cover of the second embodiment, the connection layer 6 is also disposed at a position other than the radio wave transmitting area of the radio wave transmission cover.

In the same manner as the radio wave transmission cover of the first embodiment, the radio wave transmission cover of the second embodiment has a superior design, reduces wave transmission loss, evenly transmits radio waves in the thickness direction and in the radial direction, and is constructed such that the front side member 1, the connection layer 6 and the rear side member 5 are firmly integrated with each other.

Furthermore, in the radio wave transmission cover of the second embodiment, the first engaging part 11 is provided on the colored resin layer 32. Hence, the portion around which the first engaging part 11 and the third engaging part 63 are engage with each other cannot be observed when seen in the front view of the radio wave transmission cover. Thereby, the radio wave transmission cover of the second embodiment can have a superior design.

In addition, the transparent layer 2 of the radio wave transmission cover of the second embodiment has the parting parts 25 and 26. Therefore, although the two-tone forming method is used to form the transparent layer 2, the inside colored resin layer 320 and the outside colored resin layer 321, the positions of the boundary line between the inside colored resin layer 320 and the transparent layer 2 (the first parting part 25) and the boundary line between the outside colored resin layer 321 and the transparent layer 2 (the second parting part 26) can be precisely determined. The reason for this is as follows.

In the radio wave transmission cover of the second embodiment, to form the composite body of the transparent layer 2, the inside colored resin layer 320 and the outside colored resin layer 321 through the two-tone forming process, the transparent layer 2 is formed first. Subsequently, the transparent layer 2 is placed in an injection mold for forming the inside colored resin layer 320 and the outside colored resin layer 321. The inside colored resin layer 320 and the outside colored resin layer 321 are thereafter formed on the rear surface of the transparent layer 2.

Here, the radio wave transmission cover of the second embodiment is configured such that the protruding edge 250 of the first parting part 25 protrudes from the circumferential outer edge of the inside colored resin layer 320 in the rearward direction, and such that the protruding edge 260 of the second parting part 26 protrudes from the circumferential inner edge of the outside colored resin layer 321 in the rearward direction. Therefore, the protruding edge 250 of the first parting part 25 and the protruding edge 260 of the second parting part 26 are brought into pressure contact with the mold surface of the injection mold for forming the inside colored resin layer 320 and the outside colored resin layer 321, thus being stably supported by the mold surface of the injection mold. As such, because the first parting part 25 and the second parting part 26 are stably supported, even if the transparent layer 2 contracts after being formed, the boundary line between the inside colored resin layer 320 and the transparent layer 2 (the first parting part 25) and the boundary line between the outside colored resin layer 321 and the transparent layer 2 (the second parting part 26) are prevented from being displaced from their respective correct positions. Therefore, the radio wave transmission cover of the second embodiment can have a superior design.

Third Embodiment

Figure 5:
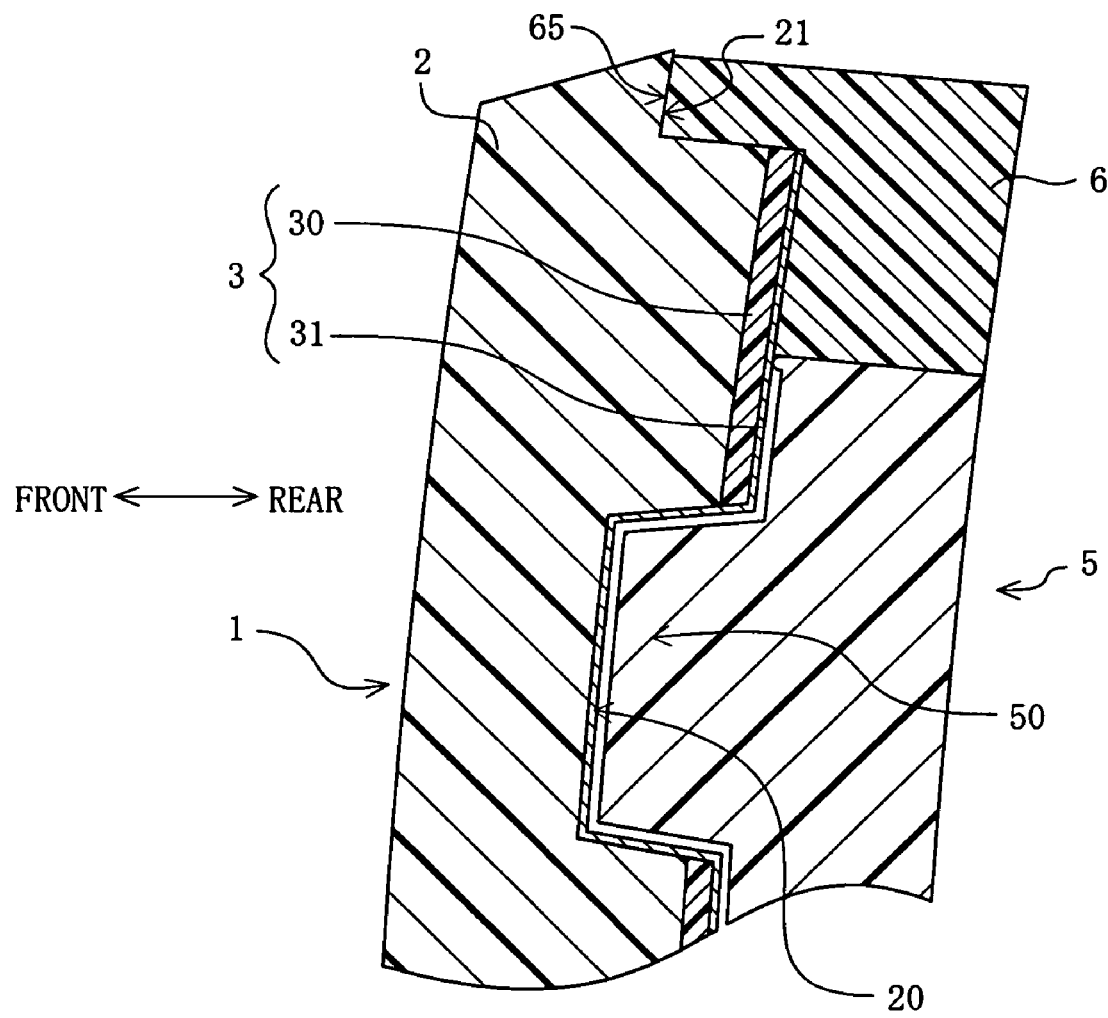
FIG. 5 is an enlarged view illustrating a main part of a radio wave transmission cover, according to a third embodiment of the present invention.

A radio wave transmission cover according to a third embodiment of the present invention includes the above (1), (3) and (4). FIG. 5 is an enlarged view illustrating a main part of the radio wave transmission cover according to the third embodiment of the present invention. In detail, FIG. 5 is an enlarged sectional view of the main part of the radio wave transmission cover of the third embodiment, corresponding to the sectional view taken along the line A-A of FIG. 1*a*. Hereinafter, in the third embodiment, the terms "front" and "rear" respectively are defined front and rear shown in FIG. 5.

The radio wave transmission cover according to the third embodiment has almost the same construction as that of the radio wave transmission cover according to the first embodiment, but lacks a first engaging part, a second engaging part, a third engaging part and a fourth engaging part.

In the radio wave transmission cover according to the third embodiment, a front side member 1 includes a transparent layer 2 and a design layer 3, in the same manner as the front side member of the first embodiment. The design layer 3 includes a printed part 30, which is formed by screen-printing black paint, and a vapor-deposited part 31, which is formed by vapor-depositing indium, in the same manner as the design layer of the first embodiment.

The transparent layer 2 is made of polycarbonate resin. Transparent layer 2 has a first depression 20, which has an annular shape, is arranged in the rear surface side of the transparent layer 2. And the transparent layer 2 has a second depression 21, which extends in a circumferential direction, is arranged in the transparent layer 2 outside the first depression 20.

In the same manner as the radio wave transmission cover of the first embodiment, the front side member is made of mixed resin material of polycarbonate resin and carbon black and has an approximately elliptical plate shape. The outer diameter of the rear side member 5 is less than that of the front side member 1. The rear side member 5 is formed on the inside portion of the rear surface of the front side member 1. The rear side member 5 has a protruding part 50, which is inserted into the first depression 20 of the front side member 1, is arranged in the front surface side of the rear side member 5. The distance between the front side member 1 and the rear side member 5 in the front-to-rear direction is 0.1 mm.

A spacer 9 is integrally formed with the rear side member 5. In detail, the spacer 9 has an approximate ring shape, which extends along the circumferential outer edge of the rear side member 5 and protrudes towards the front side member 1, and is integrally formed with the rear side member 5 into a single body. The protruding height of the spacer 9 is 0.1 mm. Furthermore, the spacer 9 faces to the printed part 30 of the front side member 1.

The connection layer 6 is made of the same mixed resin material of polycarbonate resin and carbon black as is the rear side member 5. The connection layer 6 has an annular shape having an approximately L-shaped cross-section. The connection layer 6 has a protrusion 65, which extends in a circumferential direction, is arranged in the circumferential outer edge of the front surface of the connection layer 6. The protrusion 65 is inserted into the second depression 21. Furthermore, the circumferential inner surface of the connection layer 6 has a shape corresponding to that of the circumferential outer surface of the rear side member 5. In addition, the connection layer 6 and the front side member 1 (the transparent layer 2) are welded to each other at the junction therebetween. The connection layer 6 and the rear side member 5 are also welded to each other at the junction therebetween. In the radio wave transmission cover of the third embodiment, the connection layer 6 is also outside the radio wave transmitting area.

In the same manner as the radio wave transmission cover of the first embodiment, to manufacture the radio wave transmission cover of the third embodiment, the front side member 1 and the rear side member 5, which are previously formed separately, are placed in an injection mold in a state in which the relative positions thereof are fixed. Thereafter, the connection layer 6 is formed on the rear surface of the front side member 1 and outside the rear side member 5 through an insert molding process, thus completing the radio wave transmission cover. Here, when the connection layer 6 is formed, the material (molten mixed resin material) for the connection layer 6 is partially mixed with part of the transparent layer 2, and the molten mixed resin material thereof is also partially mixed with part of the rear side member 5. Thus, the transparent layer 2, the connection layer 6 and the rear side member 5 are firmly integrated with each other. Therefore, although the radio wave transmission cover of the third embodiment lacks a first engaging part, a second engaging part, a third engaging part and a fourth engaging part, gaps are prevented from being formed between the front side member 1 and the connection layer 6 and between the rear side member 5 and the connection layer 6. As a result, a foreign substance such as water is prevented from entering the radio wave transmission cover through the gap, so that the design layer 3 can be prevented from being deformed by foreign substances.

Moreover, in the same manner as the radio wave transmission cover according to the first embodiment, the radio wave transmission cover according to the third embodiment can have a superior design, reduce a wave transmission loss, and evenly transmit radio waves in the thickness direction and in the radial direction.

Fourth Embodiment

Figure 6:
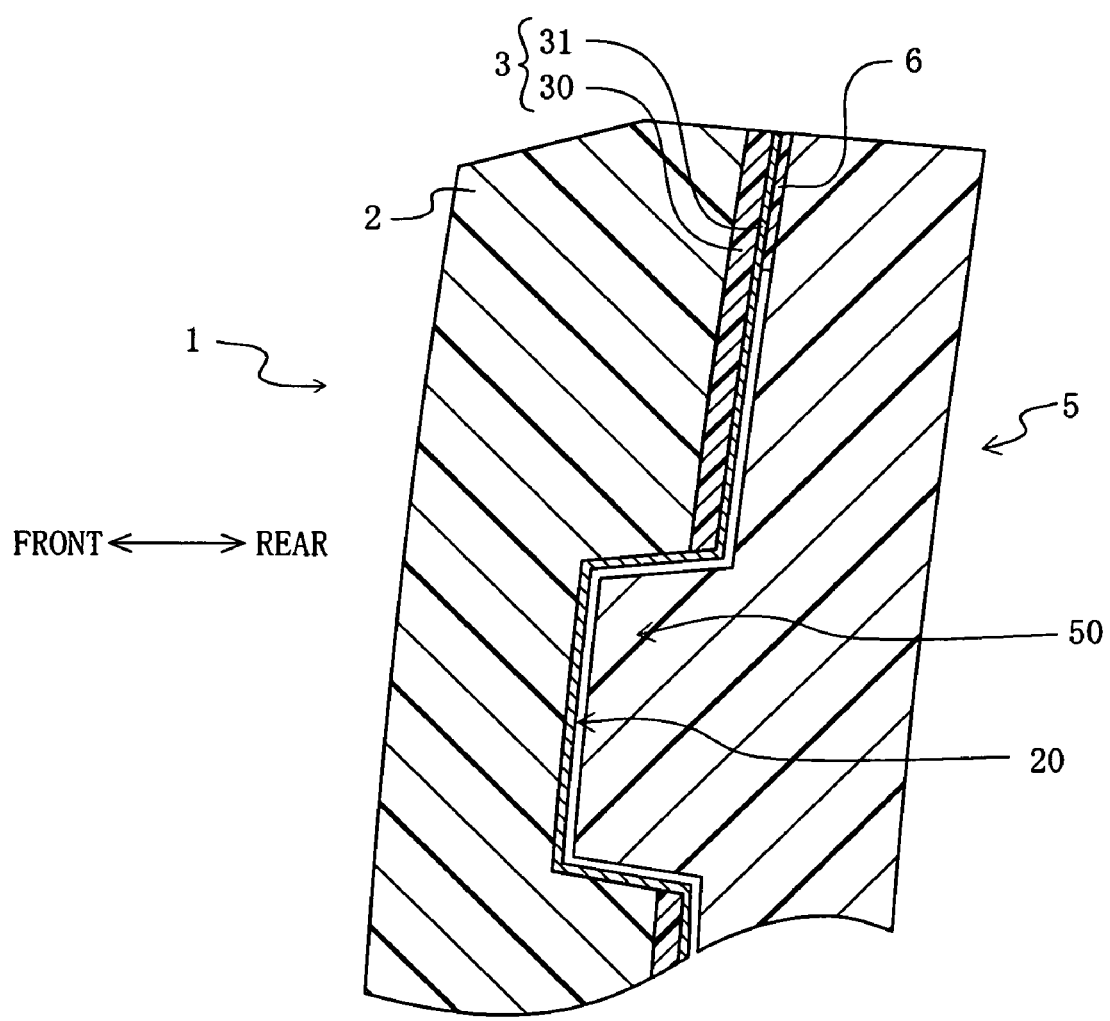
FIG. 6 is an enlarged view illustrating a main part of a radio wave transmission cover, according to a fourth embodiment of the present invention.

The radio wave transmission cover according to a fourth embodiment of the present invention includes the above (4). FIG. 6 is an enlarged view illustrating a main part of the radio wave transmission cover according to the fourth embodiment of the present invention. In detail, FIG. 6 is an enlarged sectional view of the main part of the radio wave transmission cover of the fourth embodiment, corresponding to the sectional view taken along the line A-A of FIG. 1a. Hereinafter, in the fourth embodiment, the terms "front" and "rear" respectively are defined front and rear shown in FIG. 6.

The radio wave transmission cover according to the fourth embodiment has almost the same construction as that of the radio wave transmission cover according to the first embodiment, but lacks a first engaging part, a second engaging part, a third engaging part, a fourth engaging part and a spacer, and has a structure in which an adhesive is used as an connection layer 6.

In the radio wave transmission cover according to the fourth embodiment, a front side member 1 includes a transparent layer 2 and a design layer 3, in the same manner as the front side member of the first embodiment. The transparent layer 2 is made of polycarbonate resin. The transparent layer 2 has a depression 20, which has an annular shape, is arranged in the rear surface side of the transparent layer 2.

In the same manner as the radio wave transmission cover according to the first embodiment, the rear side member 5 is made of mixed resin material of polycarbonate resin and carbon black and has an approximately elliptical plate shape. The outer diameter of the rear side member 5 is almost the same as that of the front side member 1. The rear side member 5 is formed on the rear surface of the front side member 1. The rear side member 5 has a protruding part 50, which is inserted into the depression 20 in the front side member 1, is arranged in the front surface side of the rear side member 5. The distance between the front side member 1 and the rear side member 5 in the front-to-rear direction is 0.1 mm.

The connection layer 6 is applied on a circumferential outer edge of the rear surface of the front side member 1. The connection layer 6 is adhered to the front side member 1 and the rear side member 5. In the radio wave transmission cover of the second embodiment, the connection layer 6 is also disposed at a position outside of a radio wave transmitting area of the radio wave transmission cover.

The radio wave transmission cover of the fourth embodiment is manufactured by adhering the front side member 1 and the rear side member 5, which are previously manufactured, to each other using the connection layer 6, which comprises adhesive, such that they are integrated with each other. Therefore, in the radio wave transmission cover of the fourth embodiment, even when the connection layer 6 is formed, little pressure or heat is applied to the design layer 3. Thus, the radio wave transmission cover of the fourth embodiment can reliably prevent deformation of the design layer 3, thereby ensuring a superior design.

Furthermore, the distance between the front side member 1 and the rear side member 5 with respect to the front-to-rear direction is 0.1 mm, which is not excessively long. The connection layer 6 is disposed a position other than a radio wave transmitting area. Hence, the radio wave transmission cover of the fourth embodiment can ensure superior radio wave transmissibility.

In addition, because the distance between the front side member 1 and the rear side member 5 in the front-to-rear direction is 0.1 mm, which is not excessively short, the superior design of the radio wave transmission cover of the fourth embodiment can be ensured.

Fifth Embodiment

Figure 7:
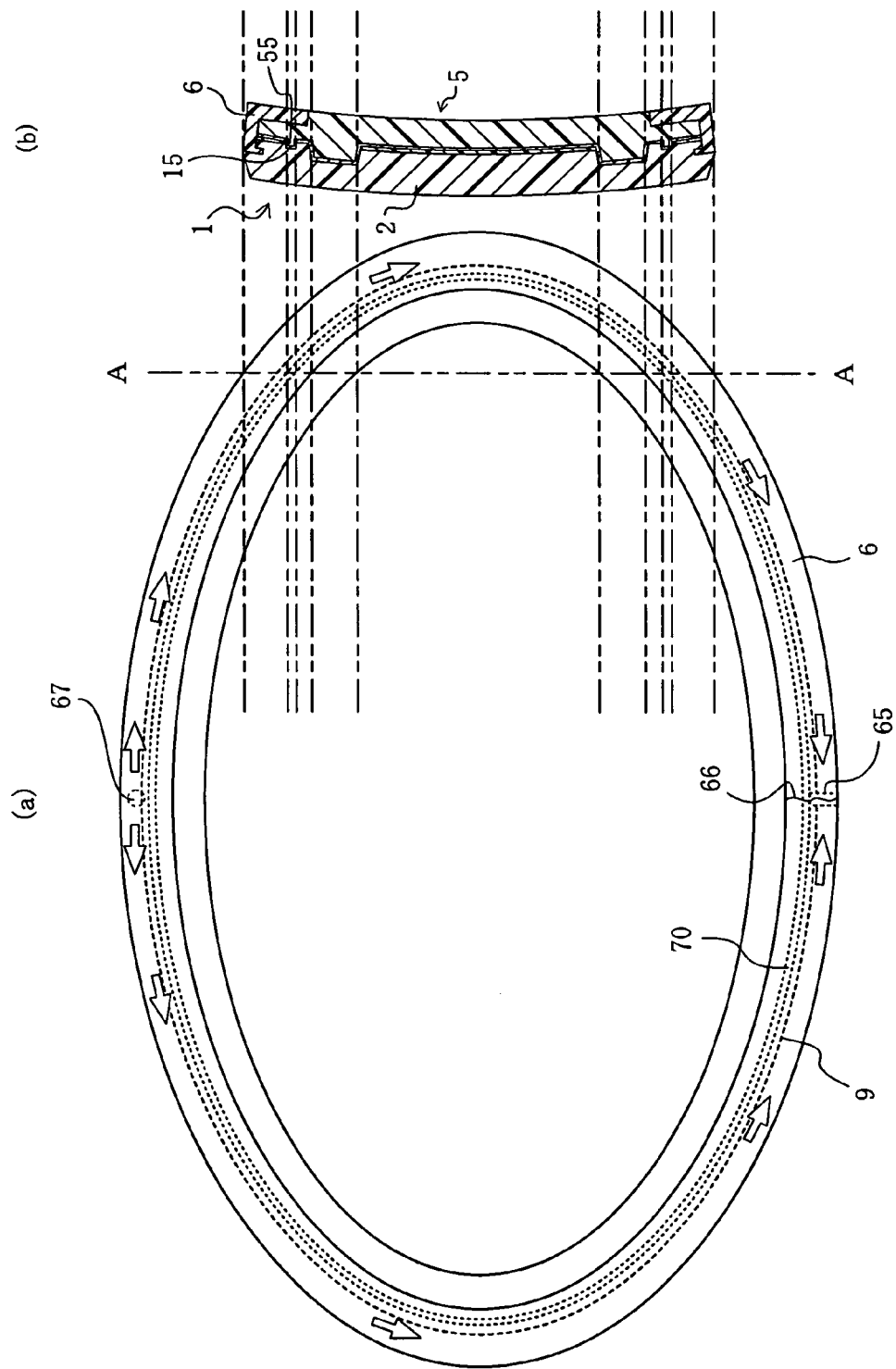
FIG. 7 is views illustrating a radio wave transmission cover, according to a fifth embodiment of the present invention.
Figure 8:
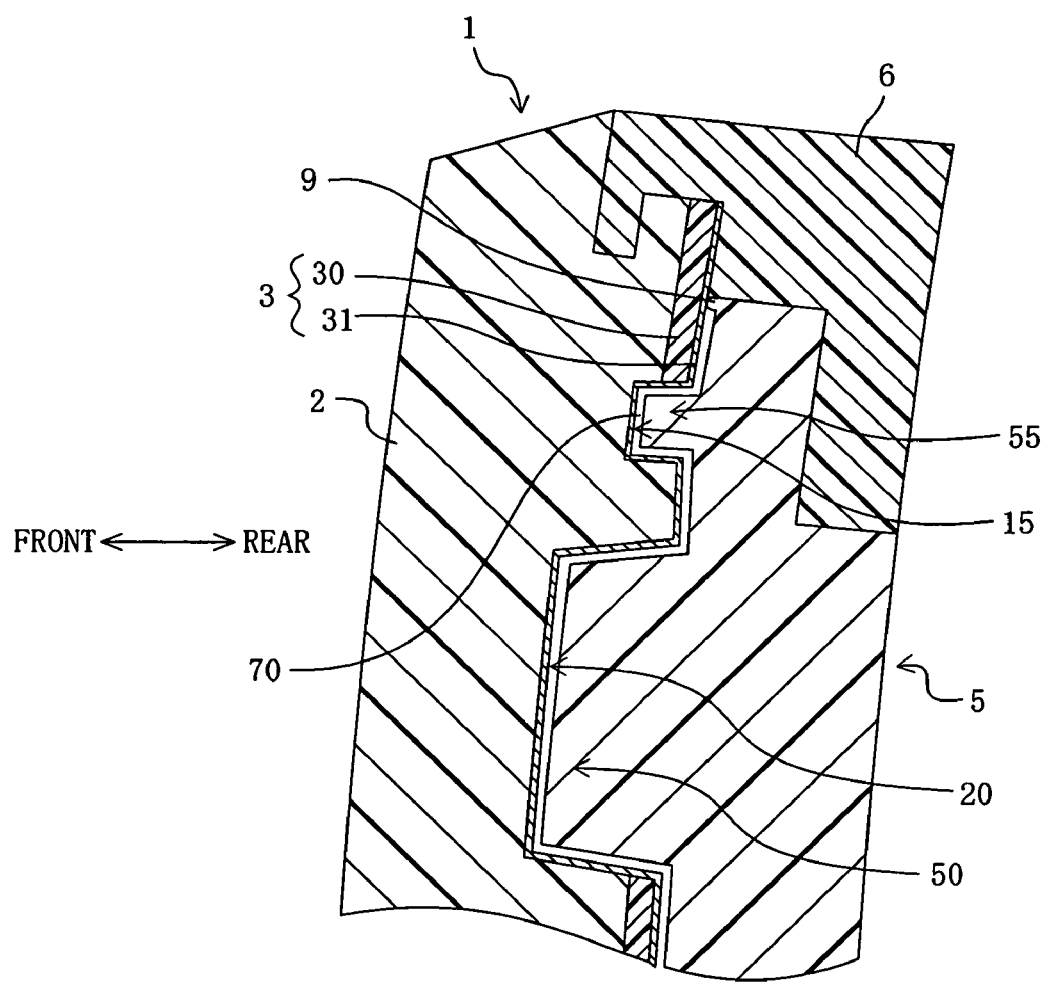
FIG. 8 is an enlarged view of a main part of FIG. 7b.
Figure 9:
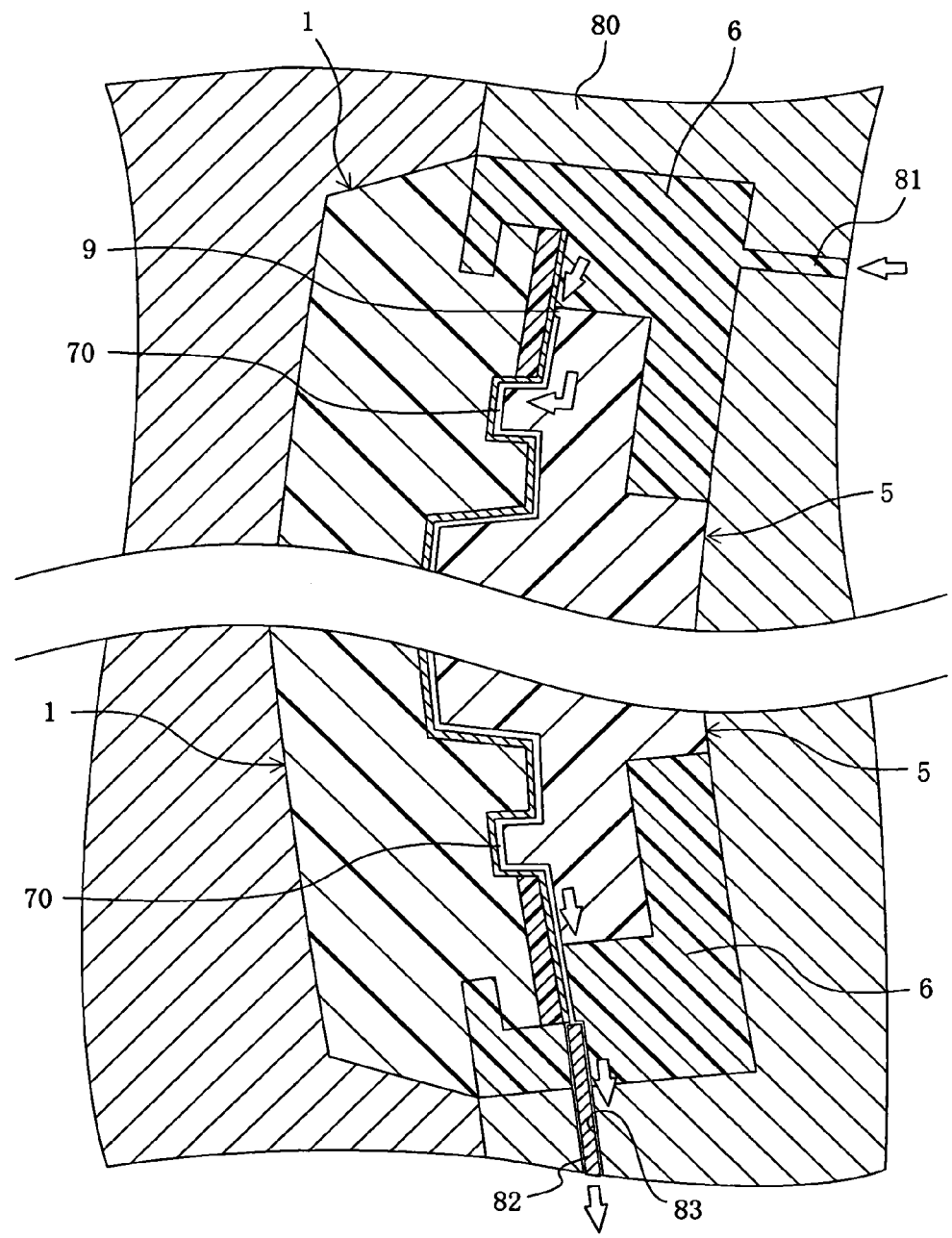
FIG. 9 is views illustrating a process of manufacturing the radio wave transmission cover according to the fifth embodiment of the present invention.

A radio wave transmission cover according to a fifth embodiment includes the above (1) through (4). The method of manufacturing the radio wave transmission cover according to the fifth embodiment is the manufacturing method of the present invention. The method of manufacturing the radio wave transmission cover according to the fifth embodiment includes above (5). FIG. 7 is views illustrating the radio wave transmission cover of the fifth embodiment. FIG. 7a is a front view showing the radio wave transmission cover according to the fifth embodiment. FIG. 7b is a sectional view taken along the line A-A of FIG. 7a. FIG. 8 is an enlarged view of a main part of FIG. 7b. FIG. 9 is a view illustrating the method of manufacturing the radio wave transmission cover according to the fifth embodiment. Hereinafter, in the fifth embodiment, the terms "front" and "rear" respectively are defined front and rear shown in FIG. 8.

The radio wave transmission cover of the fifth embodiment has almost the same construction as that of the radio wave transmission cover of the first embodiment, other than a structure in which a front side member 1 includes a concave gas interruption part 15 and a rear side member 5 has a convex gas interruption part 55.

As shown in FIG. 7, the transparent layer 2 has a concave gas interruption part 15, is arranged in the rear surface of the transparent layer 2. In detail, as shown in FIG. 8, the concave gas interruption part 15 is arranged in the transparent layer 2 at a position outside a depression 20. The concave gas interruption part 15 has a concave shape and extends in the circumferential direction of the radio wave transmission cover to thus have an annular shape. The inner surface of the concave gas interruption part 15 is coated with a vapor-deposited part 31 of a design layer 3.

The convex gas interruption part 55 is arranged in the front surface side of the rear side member 5. In detail, the convex gas interruption part 55 is arranged in the rear side member 5 at a position outside a protruding part 50. The convex gas interruption part 55 has a convex shape and extends in the circumferential direction of the radio wave transmission cover to have an annular shape. In addition, the convex gas interruption part 55 has a shape complementary to the concave gas interruption part 15.

As shown in FIG. 8, when the front side member 1 is coupled to the rear side member 5, the convex gas interruption part 55 is inserted into the concave gas interruption part 15. At this time, a gap is defined between the front side member 1 and the convex gas interruption part 55. The size of the gap in the front-to-rear direction (that is, the distance between the concave gas interruption part 15 and the convex gas interruption part 55 in the front-to-rear direction) is 0.1 mm, which is equal to the distance between portions of the front side member 1 other than the concave gas interruption part 15 and portions of the rear side member 5 other than the convex gas interruption part 55 in the front-to-rear direction.

As shown in FIG. 7, a gas exhaust hole 65 is formed in a connection layer 6. The gas exhaust hole 65 is formed adjacent to a welding line 66, which is formed in the connection layer 6. In other words, the gas exhaust hole 65 is formed at the furthest downstream position of the flow of resin, the beginning point of which is a gate mark 67, which is formed in the connection layer 6 and is a remnant corresponding to a resin injection gate 81 of an injection mold 80 for forming the connection layer 6.

One end of the gas exhaust hole 65 communicates with the gap 70 between the concave gas interruption part 15 and the convex gas interruption part 55, and another end thereof is open through the circumferential outer surface of the connection layer 6. The gas exhaust hole 65 is sealed by a sealing member (not shown), which is made of material such as urethane, silicone, etc.

A spacer 9 is integrally formed with the rear side member 5. In detail, the spacer 9 extends along the circumferential outer edge of the rear side member 5, protrudes towards the front side member 1, and is integrally formed with the rear side member 5 into a single body. The protruding height of the spacer 9 is 0.1 mm. Furthermore, as shown in FIG. 7, the spacer 9 is disposed outside the convex gas interruption part 55. The spacer 9 has an approximate C shape and is formed at portions other than a line connecting the gas exhaust hole 65 to the convex gas interruption part 55 (that is, other than a gas passage connecting a gas diversion space 70 to the gas exhaust hole 65).

Below, the method of manufacturing the radio wave transmission cover according to the fifth embodiment of the present invention will be explained.

First, the front side member 1 and the rear side member 5 are formed through processes that are the same as the first through fourth processes of the method of manufacturing the radio wave transmission cover of the first embodiment. Thereafter, the rear side member 5 and the front side member 1 are placed in an injection mold 80 in a state in which the relative positions thereof are controlled.

Subsequently, as shown in FIG. 9, the connection layer 6 is formed by an insert molding method using the injection mold 80, in which the front side member 1 and the rear side member 5 are placed. Here, the connection layer 6 is formed on the rear surface of the front side member 1 and outside the rear side member 5. The injection mold 80 has a pin 82 for forming the gas exhaust hole 65. The pin 82 is inserted into a pin hole 83, which is formed in the mold surface of the injection mold 80.

As illustrated by the arrows of FIG. 7a, in the process of forming the connection layer 6, gas, which is generated from material (molten mixed resin material) for the connection layer 6, flows from an upstream position (the resin injection gate 81) of the flow of resin to downstream position as molten mixed resin material is injected into a cavity of the injection mold 80. Furthermore, as illustrated by the arrows in FIG. 9, the gas enters the gap between the front side member 1 and the rear side member 5 and reaches the gap 70 (hereinafter, referred to as the gas diversion space 70) between the concave gas interruption part 15 and the convex gas interruption part 55.

However, the gas diversion space 70 is defined by the concave gas interruption part 15 and the convex gas interruption part 55, so that the gas diversion space 70 has a labyrinth shape, which is bent in a U shape when seen in a sectional view of the radio wave transmission cover. Thus, it becomes difficult for gas, which has reached the gas diversion space 70, to flow from the outside portion of the radio wave transmission cover to the inside portion thereof. Therefore, gas, which has reached the gas diversion space 70, flows in the direction in which the gas diversion space 70 extends, that is, in the circumferential direction of the radio wave transmission cover, as shown by the arrows in FIG. 7a, and, thereafter, it is exhausted outside the radio wave transmission cover through the gas exhaust hole 65. Thereafter, the gas is exhausted outside the injection mold 80 through a gap between the pin 82 and the pin hole 83, as shown in FIG. 9.

Subsequently, after the molten mixed resin is cooled and solidified, the radio wave transmission cover, which consists of the front side member 1, the rear side member 5 and the connection layer 6, is removed from the injection mold 80. The gas exhaust hole 65 is thereafter sealed by the sealing member, which is made of material such as urethane, silicone, etc. Ultimately, the radio wave transmission cover of the fifth embodiment is completed through the above-mentioned processes.

In the method of manufacturing the radio wave transmission cover according to the fifth embodiment of the present invention, although gas, which is generated when forming the connection layer 6, enters the gap between the front side member 1 and the rear side member 5, after the gas reaches the gas diversion space 70, the gas can no longer flow towards the inside portion of the radio wave transmission cover, but is exhausted outside the radio wave transmission cover through the gas exhaust hole 65. Furthermore, when the connection layer 6 contracts after being formed, the gap between the front side member 1 and the rear side member 5 enters a negative pressure state. Thus, outside air is drawn into the radio wave transmission cover through the gas exhaust hole 65, so that the air pressure in the gap between the front side member 1 and the rear side member 5 becomes almost equal to that of the atmosphere pressure. In addition, because the gas exhaust hole 65 is sealed by the sealing member after the connection layer 6 is formed (after the connection layer 6 contracts), the gap between the front side member 1 and the rear side member 5 can be airtightly and/or watertightly sealed. Thus, according to the method of manufacturing the radio wave transmission cover of the fifth embodiment, gas can be prevented from entering the inside portion of the radio wave transmission cover, and foreign substances such as water can be prevented from entering the radio wave transmission cover. Accordingly, the method of manufacturing the radio wave transmission cover according to the fifth embodiment of the present invention makes it possible to manufacture a radio wave transmission cover having a superior design and superior transmissibility.

Moreover, because the spacer 9 is provided between the front side member 1 and the rear side member 5, even if molten resin enters the gap between the front side member 1 and the rear side member 5 when the connection layer 6 is formed, the spacer 9 interrupts the flow of molten resin. Thus, molten resin can be reliably prevented from entering the inside portion of the radio wave transmission cover. Furthermore, the spacer 9 is disposed at a position outside the concave gas interruption part 15 and is disposed such that it does not interfere with the gas exhaust hole 65. Hence, the spacer 9 is prevented from interfering with the gas passage, which extends from the gas diversion space 70 to the gas exhaust hole 65. Thereby, a radio wave transmission cover having a superior design and superior transmissibility can be manufactured by the method of manufacturing the radio wave transmission cover according to the fifth embodiment.

Sixth Embodiment

Figure 10:
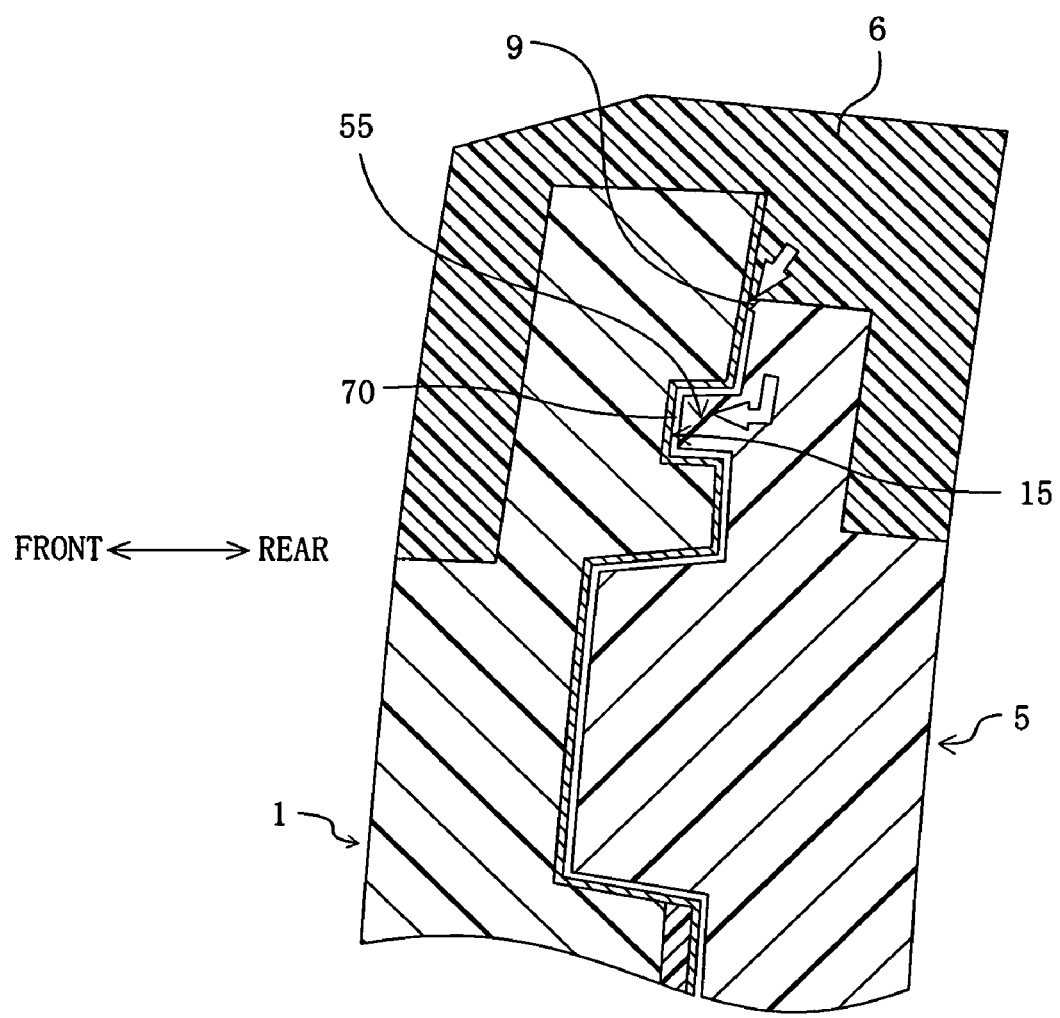
FIG. 10 is an enlarged view illustrating a main part of a radio wave transmission cover, according to a sixth embodiment of the present invention.

A radio wave transmission cover according to a sixth embodiment includes the above (1) through (4). The method of manufacturing the radio wave transmission cover according to the sixth embodiment is the manufacturing method of the present invention. The method of manufacturing the radio wave transmission cover according to the sixth embodiment includes above (5). FIG. 10 is an enlarged view showing a main part of the radio wave transmission cover of the sixth embodiment. In detail, FIG. 10 is an enlarged sectional view of the main part of the radio wave transmission cover of the sixth embodiment, corresponding to the sectional view taken along line A-A of FIG. 7a. Hereinafter, in the sixth embodiment, the terms "front" and "rear" respectively are defined front and rear shown in FIG. 10.

The radio wave transmission cover according to the sixth embodiment has almost the same construction as the radio wave transmission cover according to the fifth embodiment, other than having a structure in which a connection layer 6 is provided on the circumferential outer edges of a front side member 1 and a rear side member 5, and in which a front part of the connection layer 6 covers front sides of a concave gas interruption part 15 and a convex gas interruption part 55. Furthermore, in the radio wave transmission cover of the sixth embodiment, the distance between the front side member 1 and the rear side member 5 with respect to the front-to-rear direction is 0.1 mm. The method of manufacturing the radio wave transmission cover according to the sixth embodiment is almost the same as the method of manufacturing the radio wave transmission cover according to the fifth embodiment.

The radio wave transmission cover of the sixth embodiment ensures a superior design and superior radio wave transmissibility, in the same manner as the radio wave transmission cover of the first embodiment.

Furthermore, in the radio wave transmission cover of the sixth embodiment, the front part of the connection layer 6 covers the front sides of the concave gas interruption part 15 and the convex gas interruption part 55. The connection layer 6 is made of resin material including carbon black, and is black. Thus, the concave gas interruption part 15 and the convex gas interruption part 55 cannot be easily observed when seen from the front of the radio wave transmission cover. Therefore, the radio wave transmission cover of the sixth embodiment ensures a superior design.

In the method of manufacturing the radio wave transmission cover of the sixth embodiment, although gas, which is generated when the connection layer 6 is formed, enters the gap between the front side member 1 and the rear side member 5, the gas flows along a gas diversion space 70 and is exhausted outside the radio wave transmission cover through a gas exhaust hole (not shown). Hence, gas is prevented from entering the portion of the radio wave transmission cover that is disposed inside the gas diversion space 70. Furthermore, when the connection layer 6 contracts after being formed, the gap between the front side member 1 and the rear side member 5 enters a negative pressure state. Thus, outside air is drawn into the radio wave transmission cover through the gas exhaust hole, so that the air pressure in the gap between the front side member 1 and the rear side member 5 becomes almost equal to that of the atmosphere pressure. In addition, because the gas exhaust hole is sealed by a sealing member (not shown) after the connection layer 6 is formed, the gap between the front side member 1 and the rear side member 5 can be airtightly and/or watertightly sealed. Accordingly, the method of manufacturing the radio wave transmission cover according to the sixth embodiment of the present invention makes it possible to manufacture a radio wave transmission cover having superior design and radio wave transmissibility.

Seventh Embodiment

Figure 11:
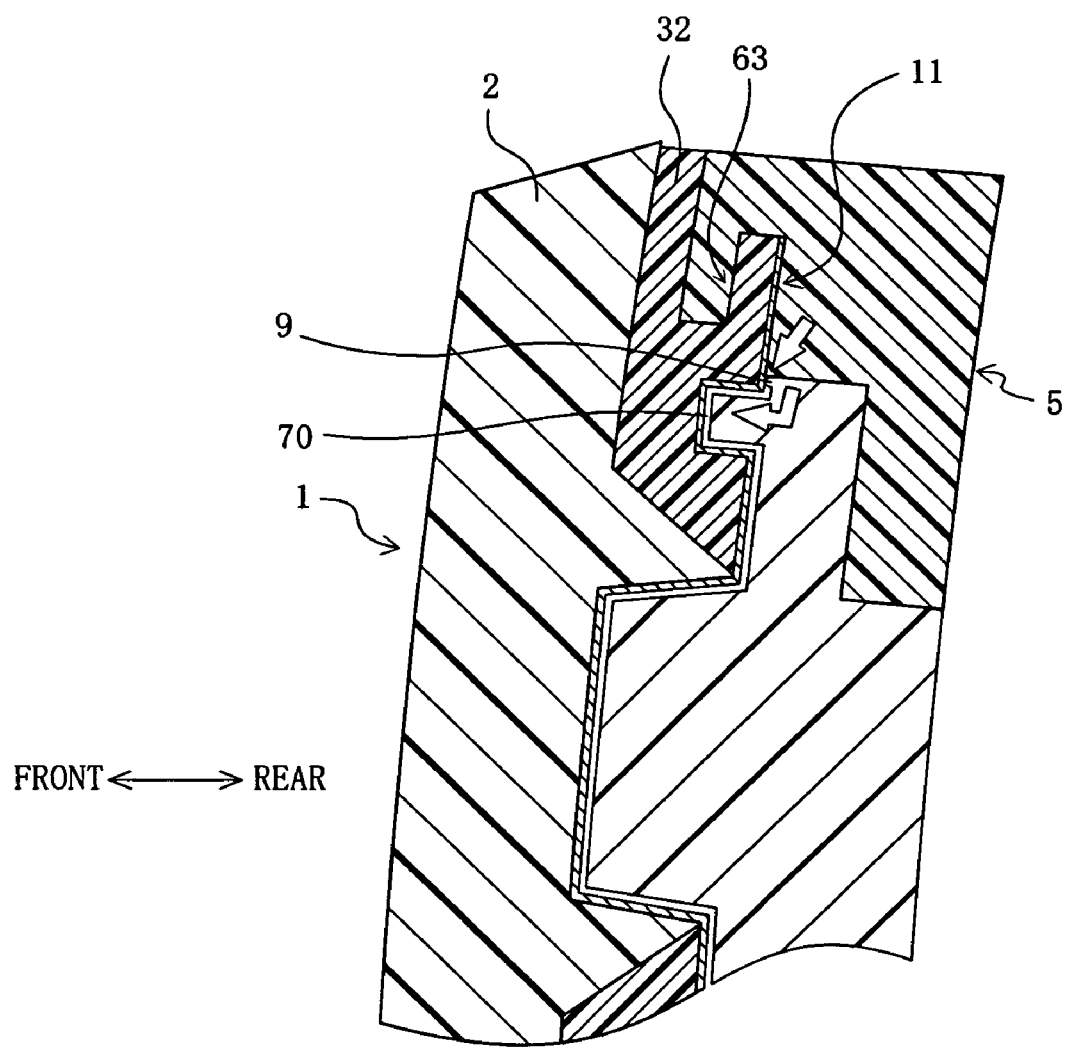
FIG. 11 is an enlarged view illustrating a main part of a radio wave transmission cover, according to a seventh embodiment of the present invention.

A radio wave transmission cover according to a seventh embodiment includes the above (1) through (4). The method of manufacturing the radio wave transmission cover according to the seventh embodiment is the manufacturing method of the present invention. The method of manufacturing the radio wave transmission cover according to the seventh embodiment includes above (5). FIG. 11 is an enlarged view showing a main part of the radio wave transmission cover of the seventh embodiment. In detail, FIG. 11 is an enlarged sectional view of the main part of the radio wave transmission cover of the seventh embodiment, corresponding to the sectional view taken along the line A-A of FIG. 7a. Hereinafter, in the seventh embodiment, the terms "front" and "rear" respectively are defined front and rear shown in FIG. 11.

The radio wave transmission cover according to the seventh embodiment has almost the same construction as that of the radio wave transmission cover according to the fifth embodiment, other than having a structure in which a front side member 1 includes a transparent layer 2 and a colored resin layer 32. Furthermore, the distance between the front side member 1 and a rear side member 5 with respect to the front-to-rear direction is 0.1 mm. The method of manufacturing the radio wave transmission cover according to the seventh embodiment is almost the same as the method of manufacturing the radio wave transmission cover according to the fifth embodiment.

The radio wave transmission cover of the seventh embodiment ensures superior design and radio wave transmissibility, in the same manner as the radio wave transmission cover of the first embodiment.

Moreover, in the radio wave transmission cover of the seventh embodiment, the colored resin layer 32 is arranged in the circumferential outer edge of the rear surface side of the transparent layer 2. The transparent layer 2 and the colored resin layer 32 are formed by a two-tone forming method. A first engaging part 11 is arranged in the colored resin layer 32. The position at which the first engaging part 11 and a third engaging part 63 engage with each other cannot be observed when observed from the front of the radio wave transmission cover. Thereby, the radio wave transmission cover of the seventh embodiment can have a superior design.

In the method of manufacturing the radio wave transmission cover of the seventh embodiment, gas, which is generated when the connection layer 6 is formed, flows along a gas diversion space 70 and is exhausted outside the radio wave transmission cover through a gas exhaust hole (not shown). Furthermore, when the gap between the front side member 1 and the rear side member 5 enters a negative pressure state due to contraction of the connection layer 6, outside air is drawn into the radio wave transmission cover through the gas exhaust hole. Therefore, gas, which is generated when the connection layer 6 is formed, is prevented from entering the portion of the radio wave transmission cover that is disposed inside the gas diversion space 70. Furthermore, the air pressure in the gap between the front side member 1 and the rear side member 5 becomes almost equal to that of the atmosphere pressure. In addition, because the gas exhaust hole is sealed by a sealing member (not shown), the gap between the front side member 1 and the rear side member 5 can be airtightly and/or watertightly sealed. Accordingly, the method of manufacturing the radio wave transmission cover according to the seventh embodiment of the present invention makes it possible to manufacture a radio wave transmission cover having a superior design and superior radio wave transmissibility.

(Transmission Loss Test)

Figure 12:
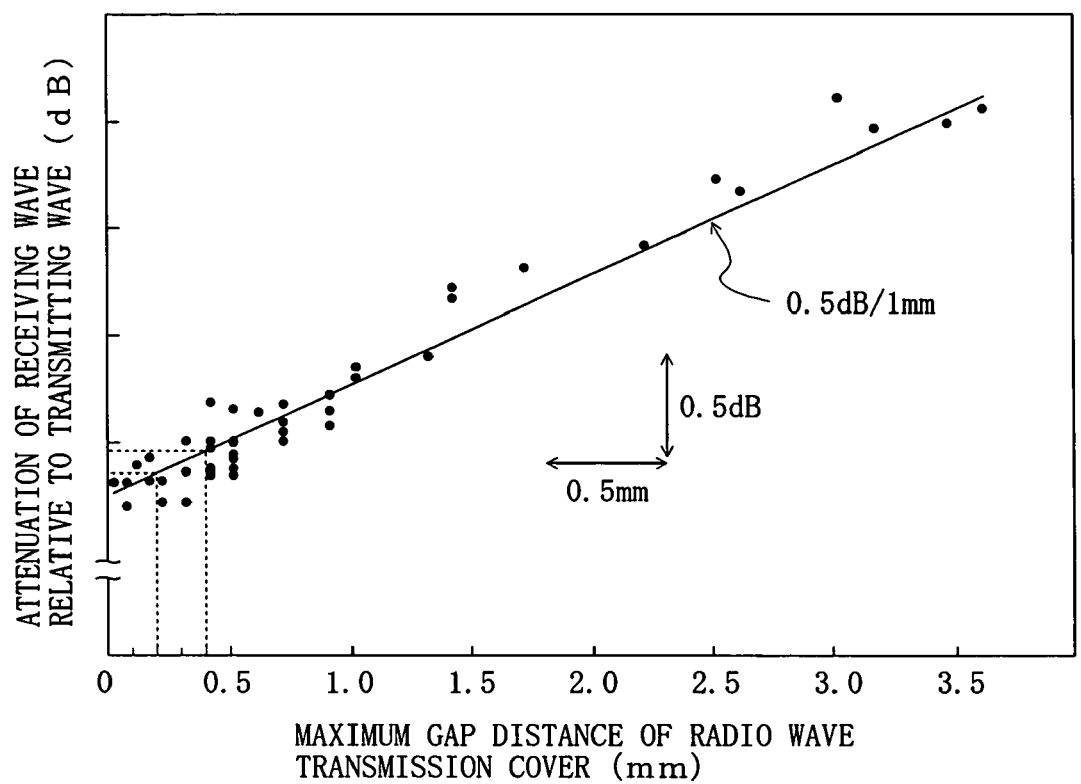
FIG. 12 is a graph showing the result of a wave transmission loss test according to the present invention.
Figure 13:
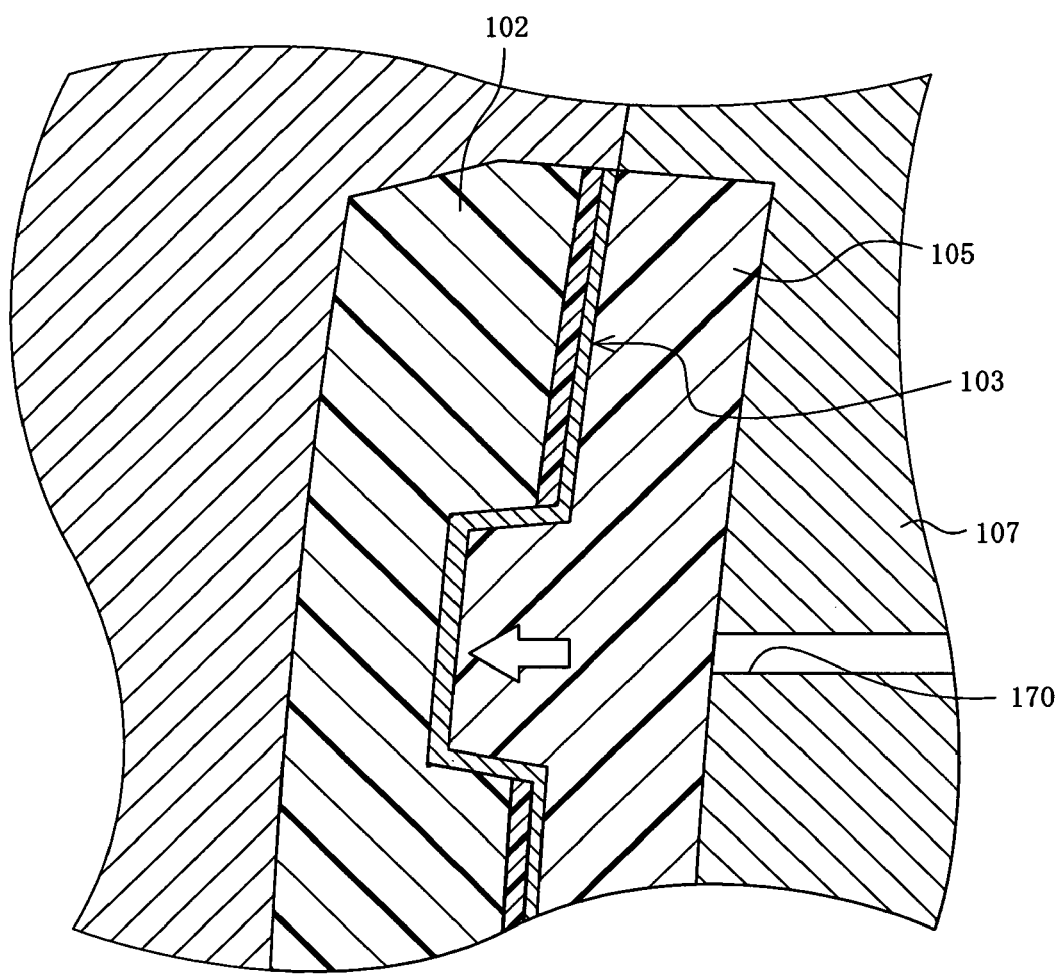
FIG. 13 is a view showing a conventional radio wave transmission cover.

Several radios wave transmission covers, which have different distances (hereinafter, referred to as gap distances) between the front side members 1 and the rear side members 5 in the front-to-rear direction, were prepared, and the transmission losses of the radio wave transmission covers depending on variation in gap distances were measured to find the influence of gap distance on the transmission loss of the radio wave transmission cover. In detail, several radio wave transmission covers having different gap distances were prepared. Each radios wave transmission cover was placed ahead of a millimeter wave radar. Thereafter, the intensity of a millimeter wave (a transmitting wave), which was transmitted from the millimeter wave radar, and the intensity of a millimeter wave (a receiving wave), which was received by the millimeter wave radar through the radio wave transmission cover, were measured. Each radio wave transmission cover, which was used in the transmission loss test, was the same as the radio wave transmission cover of the fourth embodiment, except for the gap distance. FIG. 12 is a graph showing the result of the wave transmission loss test. In FIG. 12, the axis of ordinate denotes attenuation (dB) of a receiving wave relative to a transmitting wave, and the axis of abscissa denotes a maximum gap distance (mm) of the radio wave transmission cover.

As shown in FIG. 12, the attenuation of a receiving wave relative to a transmitting wave (hereinafter, referred to as a radio wave attenuation) is proportional to the maximum gap distance of the radio wave transmission. For example, when the maximum gap distance of the radio wave transmission is increased by 1 mm, the radio wave attenuation is increased by 0.5 dB. If the maximum gap distance of the radio wave transmission is 0.4 mm or less, the radio wave attenuation is reduced to a degree sufficient to sense a radio wave using a millimeter wave radar for vehicles. Therefore, preferably, the maximum gap distance of the radio wave transmission is 0.4 mm or less to ensure superior radio wave transmissibility. It is further preferable that the maximum gap distance be 0.2 mm or less. If the maximum gap distance is 0.2 mm or less, the radio wave attenuation is further reduced to a degree such that the millimeter wave radar for vehicles can more reliably sense radio waves.

While the invention has been shown and described with respect to the preferred embodiments, it will be understood by those skilled in the art that various changes and modifications may be made without departing from the spirit and scope of the invention as defined in the following claims.

What is claimed is:

1. A radio wave transmission cover provided in front of a radar device for vehicles, comprising:
   a front side member having a transparent layer made of transparent resin and a design layer formed on a rear side of the transparent layer;
   a rear side member formed on a rear side of the front side member, the rear side member being made of resin; and
   a connection layer formed on a circumferential outer edge of at least one selected from the front side member and the rear side member, the connection layer being fixed to the front side member and the rear side member, wherein
   the front side member is formed separately from the rear side member,
   the front side member and the rear side member are spaced apart from each other in a front-to-rear direction by a distance ranging from 0.01mm to 0.4mm,
   the rear side member is formed on the front side member inside the circumferential outer edge of the front side member,
   the connection layer is made of resin, and
   the connection layer is welded to the front side member and the rear side member.

2. The radio wave transmission cover according to claim 1, wherein
   the front side member includes a first engaging part having an undercut shape,
   the rear side member includes a second engaging part having an undercut shape, and
   the connection layer includes a third engaging part, having an undercut shape complementary to the first engaging part, and fourth engaging part, having an undercut shape complementary to the second engaging part.

3. The radio wave transmission cover according to claim 1, wherein
   the connection layer is disposed at a position outside of a radio wave transmitting area of the radio wave transmission cover.

4. A method of manufacturing the radio wave transmission cover of claim 1, comprising:
   forming a convex gas interruption part in one selected from the front side member and the rear side member, the convex gas interruption part having a convex shape and extending in a circumferential direction of the radio wave transmission cover;
   forming a concave gas interruption part in a remaining one of the front side member and the rear side member, the concave gas interruption part having a concave shape and extending in a circumferential direction of the radio wave transmission cover;
   coupling the front side member to the rear side member such that the convex gas interruption part is inserted into the concave gas interruption part;
   forming the connection layer by injecting molten resin into a cavity of an injection mold, in which the front side member and the rear side member are placed; and
   forming a gas exhaust hole in the connection layer at a position downstream of a flow of resin with respect to a resin injection gate of the injection mold when the connection layer is formed, the gas exhaust hole communicating with a gap defined between the convex gas interruption part and the concave gas interruption part and being open through an outer surface of the connection layer.

5. The method of claim 4, wherein the gas exhaust hole is sealed by a sealing member after the connection layer is formed.

6. A radio wave transmission cover provided in front of a radar device for vehicles, comprising:
- a front side member having a transparent layer made of transparent resin and a design layer formed on a rear side of the transparent layer;
- a rear side member formed on a rear side of the front side member, the rear side member being made of resin; and
- a connection layer formed on a circumferential outer edge of at least one selected from the front side member and the rear side member, the connection layer being fixed to the front side member and the rear side member, wherein
- the front side member is formed separately from the rear side member,
- the front side member and the rear side member are spaced apart from each other in a front-to-rear direction by a distance ranging from 0.01mm to 0.4mm, and
- each of a relative permittivity of the transparent resin for the transparent layer, a relative permittivity of the resin for the rear side member, and a relative permittivity of the resin for the connection layer to a frequency of 76.5GHz is within a range of 2.7±1.5 at a room temperature.

7. The radio wave transmission cover according to claim 6, wherein
- the rear side member is formed on the front side member inside the circumferential outer edge of the front side member,
- the connection layer is made of resin, and
- the connection layer is welded to the front side member and the rear side member.

8. The radio wave transmission cover according to claim 6, wherein
- the front side member includes a first engaging part having an undercut shape,
- the rear side member includes a second engaging part having an undercut shape, and
- the connection layer includes a third engaging part, having an undercut shape complementary to the first engaging part, and a fourth engaging part, having an undercut shape complementary to the second engaging part.

9. The radio wave transmission cover according to claim 6, wherein
- the connection layer is disposed at a position outside of a radio wave transmitting area of the radio wave transmission cover.

10. A method of manufacturing the radio wave transmission cover of claim 7, comprising:
- forming a convex gas interruption part in one selected from the front side member and the rear side member, the convex gas interruption part having a convex shape and extending in a circumferential direction of the radio wave transmission cover;
- forming a concave gas interruption part in a remaining one of the front side member and the rear side member, the concave gas interruption part having a concave shape and extending in a circumferential direction of the radio wave transmission cover;
- coupling the front side member to the rear side member such that the convex gas interruption part is inserted into the concave gas interruption part;
- forming the connection layer by injecting molten resin into a cavity of an injection mold, in which the front side member and the rear side member are placed; and
- forming a gas exhaust hole in the connection layer at a position downstream of a flow of resin with respect to a resin injection gate of the injection mold when the connection layer is formed, the gas exhaust hole communicating with a gap defined between the convex gas interruption part and the concave gas interruption part and being open through an outer surface of the connection layer.

11. The method of claim 10, wherein the gas exhaust hole is sealed by a sealing member after the connection layer is formed.

* * * * *